United States Patent
Bosworth et al.

(10) Patent No.: US 11,046,416 B2
(45) Date of Patent: Jun. 29, 2021

(54) COMBINATION FLIGHT AND GROUND APPARATUS FOR A VEHICLE

(71) Applicant: Aurora Flight Sciences Corporation, Manassas, VA (US)

(72) Inventors: William Bosworth, Somerville, MA (US); Andrew Heafitz, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 372 days.

(21) Appl. No.: 16/054,307

(22) Filed: Aug. 3, 2018

(65) Prior Publication Data

US 2020/0039629 A1 Feb. 6, 2020

(51) Int. Cl.
| | |
|---|---|
| *B64C 3/42* | (2006.01) |
| *B64C 25/00* | (2006.01) |
| *B64C 29/00* | (2006.01) |
| *B64C 39/00* | (2006.01) |
| *B64C 39/02* | (2006.01) |

(52) U.S. Cl.
CPC .............. *B64C 3/42* (2013.01); *B64C 25/001* (2013.01); *B64C 29/0025* (2013.01); *B64C 29/0091* (2013.01); *B64C 39/008* (2013.01); *B64C 39/024* (2013.01)

(58) Field of Classification Search
CPC ..... B64C 3/42; B64C 25/001; B64C 29/0025; B64C 29/0091; B64C 39/005; B64C 39/008; B64C 39/024
See application file for complete search history.

(56) References Cited

U.S. PATENT DOCUMENTS

| | | | |
|---|---|---|---|
| 6,076,766 | A | 6/2000 | Gruensfelder |
| 6,922,610 | B2 | 7/2005 | Okamoto et al. |
| 7,137,589 | B2 | 11/2006 | Arata |
| 7,938,358 | B2 | 5/2011 | Dietrich et al. |
| 7,946,527 | B2 | 5/2011 | Holmes |
| 8,387,913 | B2 | 3/2013 | Karem |
| 9,481,457 | B2 | 11/2016 | Alber |
| 9,580,166 | B2 | 2/2017 | Good et al. |
| 9,821,909 | B2 | 11/2017 | Moshe |

(Continued)

FOREIGN PATENT DOCUMENTS

WO WO 2018/236295 12/2018

OTHER PUBLICATIONS

DARPA, "Robotic Landing Gear Could Enable Future Helicopters to Take Off and Land Almost Anywhere," https://www.darpa.mil/news-events/2015-09-10 (Sep. 10, 2015).

(Continued)

*Primary Examiner* — Rodney A Bonnette
(74) *Attorney, Agent, or Firm* — Walters & Wasylyna LLC

(57) ABSTRACT

A vehicle includes a fuselage having a longitudinal axis and a propulsion system that is coupled to the fuselage. The vehicle also includes a pair of articulated appendages that is coupled to the fuselage. Each one of the articulated appendages includes a plurality of airfoil segments and is moveable between a ground configuration, in which each one of the pair of articulated appendages supports the vehicle during takeoff or landing of the vehicle, and a flight configuration, in which each one of the pair of articulated appendages produces lift during flight of the vehicle.

20 Claims, 31 Drawing Sheets

(56) References Cited

U.S. PATENT DOCUMENTS

| | | |
|---|---|---|
| 9,873,502 B2 | 1/2018 | Good et al. |
| 2008/0251638 A1 | 10/2008 | Cordy |
| 2010/0051741 A1 | 3/2010 | Ismailov |
| 2010/0051742 A1 | 3/2010 | Schweighart et al. |
| 2013/0206921 A1 | 8/2013 | Paduano et al. |
| 2015/0021430 A1 | 1/2015 | Paduano et al. |
| 2016/0378120 A1 | 12/2016 | Creasman |
| 2018/0215465 A1* | 8/2018 | Renteria ................. B64C 25/10 |
| 2020/0017208 A1* | 1/2020 | James .................... B64C 39/12 |

OTHER PUBLICATIONS

Aerospace America, "Robotic landing legs," https://aerospaceamerica.aiaa.org/departments/robotic-landing-legs/ by Keith Button, (Jul./Aug. 2017).

European Patent Office, Extended European Search Report, App. No. 19188983.1 (dated Dec. 20, 2019).

Chatterjee et al.: "The Novel Characteristics of Pterosaurs: Biological Inspiration for Robotic Vehicles," International Journal of Design & Nature and Ecodynamics, vol. 8, No. 2, pp. 113-143 (Jun. 30, 2013).

* cited by examiner

COMBINATION FLIGHT AND GROUND APPARATUS FOR A VEHICLE

FIELD

The present disclosure is generally related to vehicles capable of flight and, more particularly, to combination apparatuses for flight vehicles that are configured to move between flight configurations and ground configurations and methods for operating flight vehicles during takeoff, flight, and landing using the apparatuses.

BACKGROUND

Various types of vehicles are capable of flight through a combination of lift and thrust. Some types of vehicles include a propulsion system that generates thrust and wings that generate lift caused by the vehicle's forward motion and the shape of the wings. Some types of vehicles include a propulsion system that generates both lift and thrust. Typically, these flight vehicles also include landing gear that supports the vehicle on the ground and facilitates takeoff and landing. However, the landing gear may increase drag on the vehicle during flight, which may affect fuel efficiency. It is generally desirable to reduce the drag on the vehicle during flight.

On some vehicles, the landing gear is fixed to the vehicle and is exposed during flight, which may increase drag on the vehicle. On other vehicles, the landing gear folds underneath the vehicle but remains exposed during flight, which may reduce the drag on the vehicle due to the landing gear. On yet other vehicles, the landing gear is retractable and retracts into the wings or a fuselage of the vehicle, which may eliminate the drag on the vehicle due to the landing gear.

Regardless of the particular configuration of the landing gear, the landing gear increases the weight of the vehicle, which may affect fuel efficiency, payload capacity, and operational range. It is generally desirable to reduce the weight of the vehicle. However, in many cases, the mechanisms implemented to reduce the drag on the vehicle due to the landing gear, such as folding the landing gear underneath the vehicle or retracting the landing gear into the vehicle, further increases the weight of the vehicle.

Accordingly, those skilled in the art continue with research and development efforts in the field of flight vehicles.

SUMMARY

In an example, the disclosed vehicle includes a fuselage having a longitudinal axis and a propulsion system that is coupled to the fuselage. The vehicle also includes a pair of articulated appendages that is coupled to the fuselage. Each one of the articulated appendages includes a plurality of airfoil segments and is moveable between a ground configuration, in which each one of the pair of articulated appendages supports the vehicle during takeoff or landing of the vehicle, and a flight configuration, in which each one of the pair of articulated appendages produces lift during flight of the vehicle.

In an example, the disclosed combination flight and ground apparatus for a vehicle includes an articulated appendage 106 that includes a plurality of airfoil segments and that is moveable between a ground configuration, in which the articulated appendage supports the vehicle during takeoff or landing of the vehicle, and a flight configuration, in which the articulated appendage produces lift during flight of the vehicle. The apparatus also includes a controller configured to actuate movement of the articulated appendage.

In an example, the disclosed method for operating a vehicle, the method includes steps of: (1) pivotally moving at least one of a plurality of airfoil segments of each one of a pair of articulated appendages, coupled to a fuselage of the vehicle, into a flight configuration, in which each one of the pair of articulated appendages produces lift during flight of the vehicle; and (2) pivotally moving at least one of the plurality of airfoil segments of each one of the pair of articulated appendages into a ground configuration, in which each one of the pair of articulated appendages supports the vehicle during takeoff or landing of the vehicle.

Other examples of the disclosed apparatuses and methods will become apparent from the following detailed description, the accompanying drawings and the appended claims.

DETAILED DESCRIPTION

Figure 1:
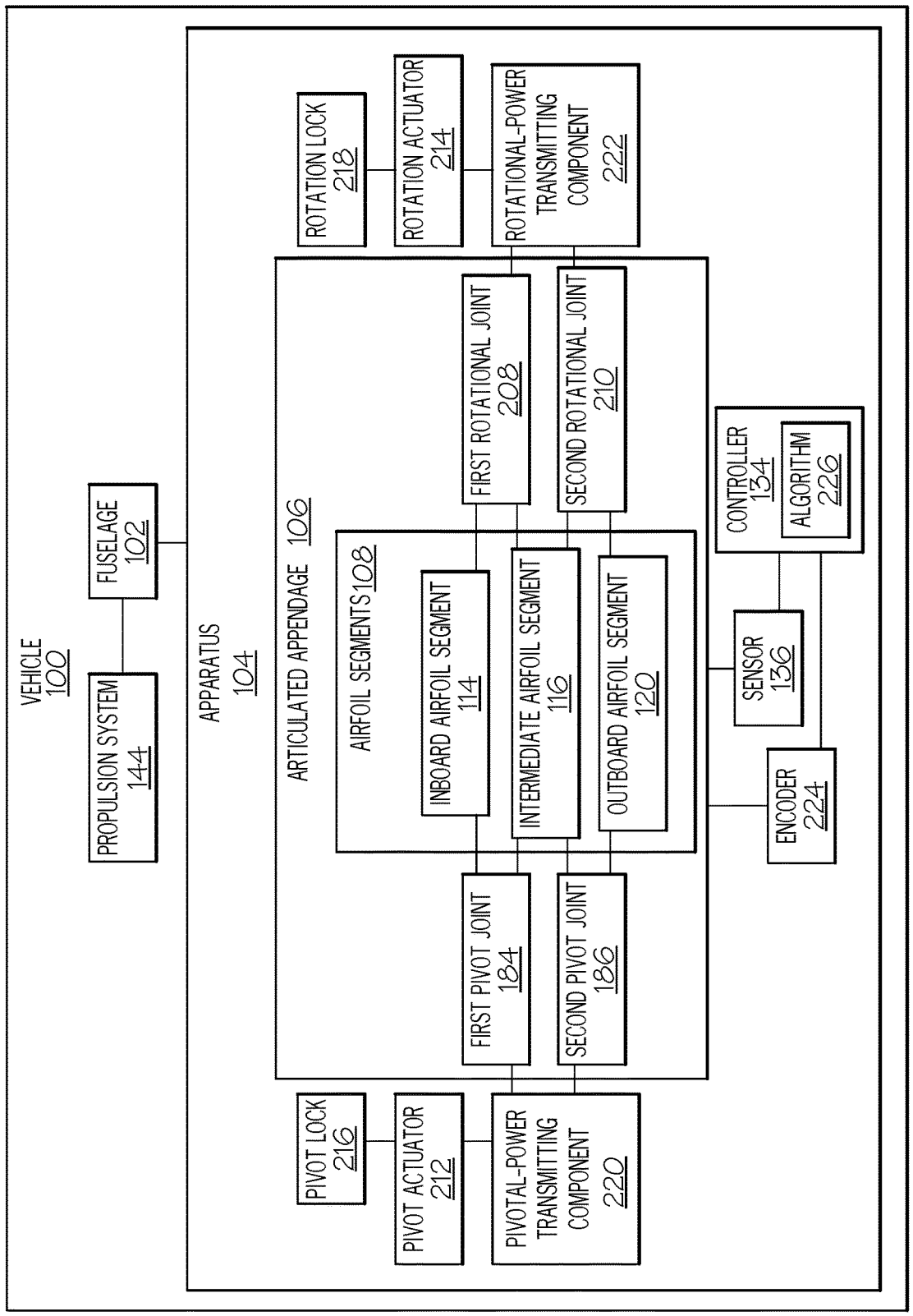
FIG. 1 is a schematic block diagram of an example of a vehicle and a combination flight and ground apparatus for a vehicle.
Figure 2:
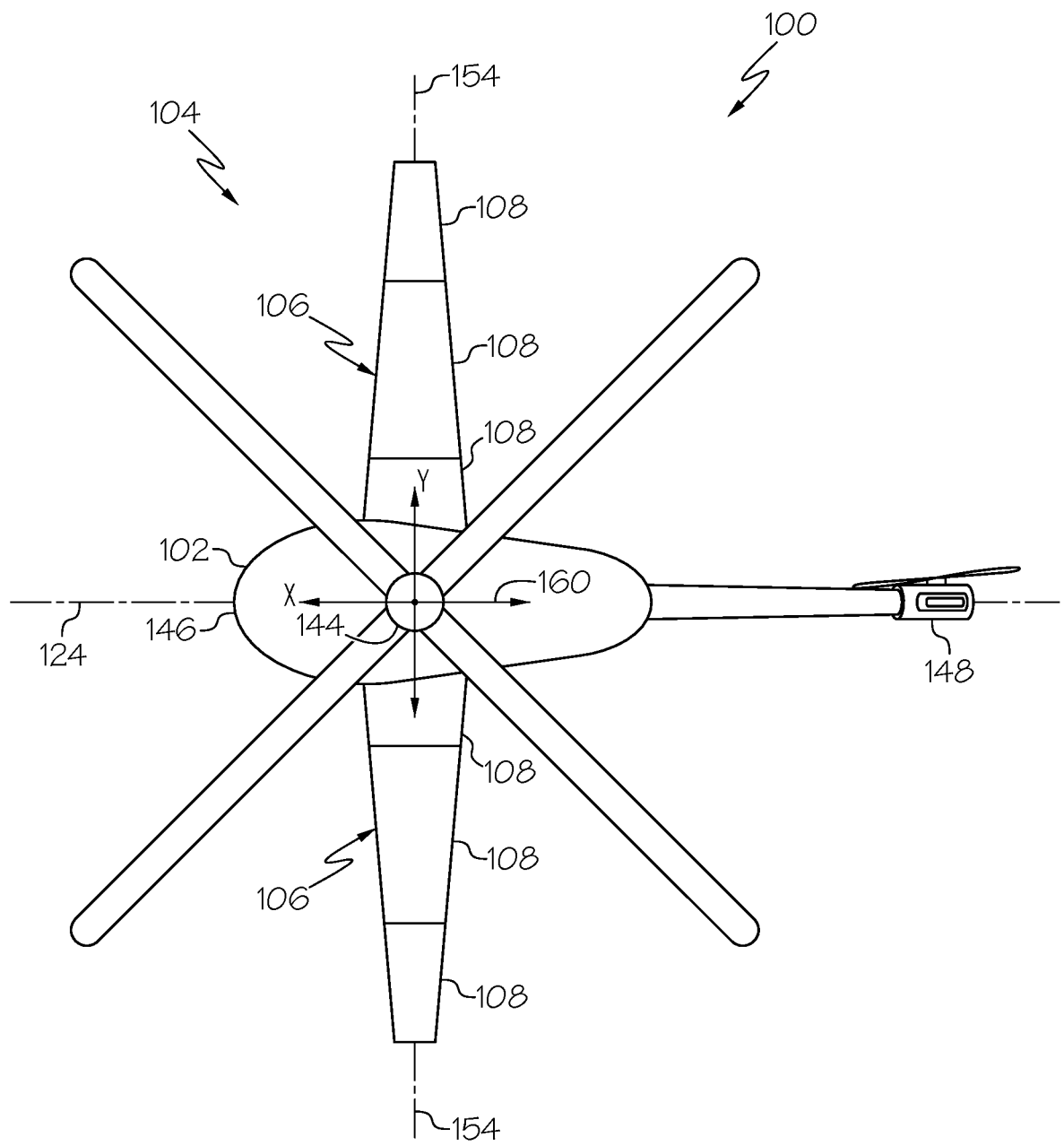
FIG. 2 is a schematic, top plan view of an example of the vehicle and the apparatus.
Figure 3:
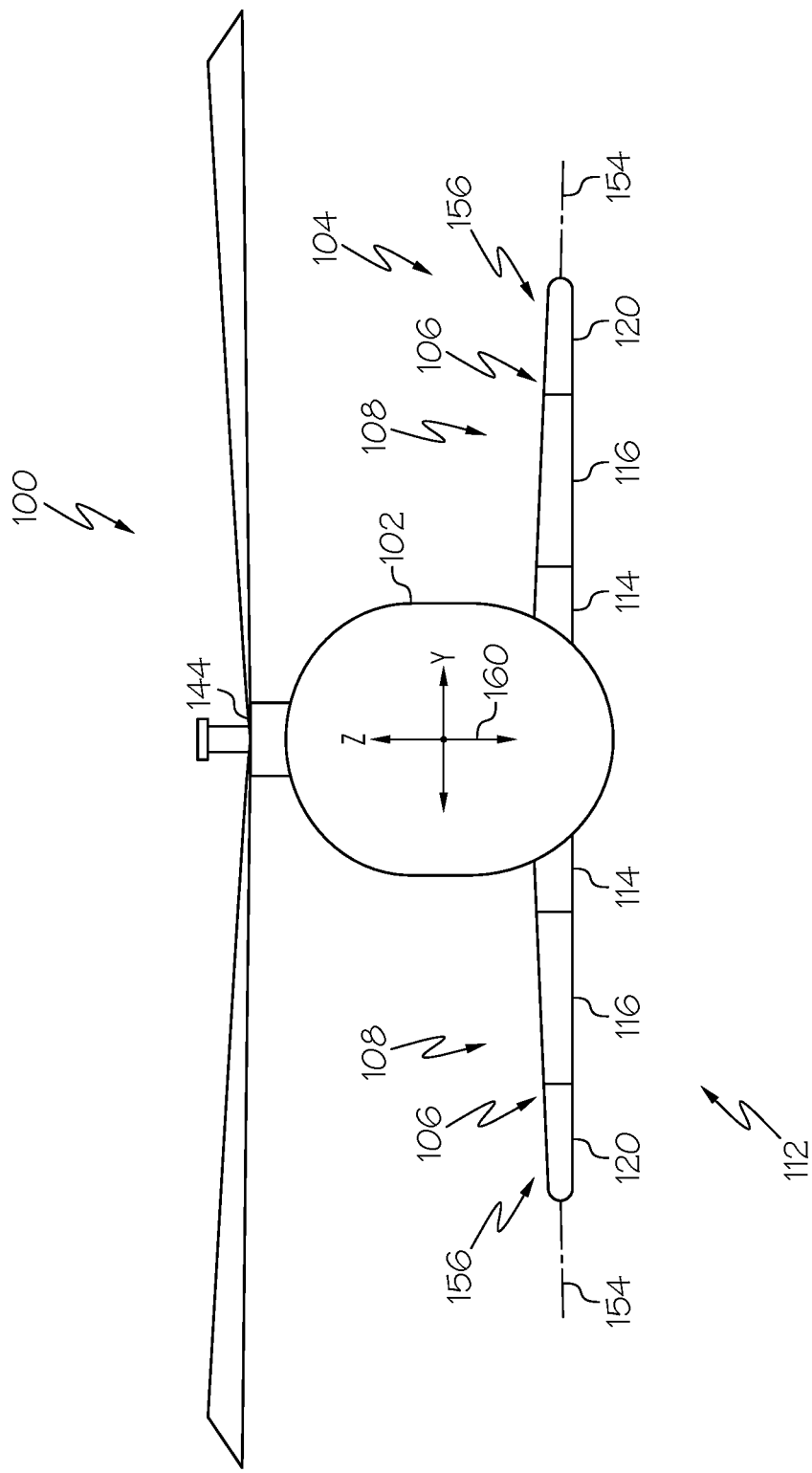
FIG. 3 is a schematic, front elevation view of an example of the vehicle and the apparatus in a flight configuration.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below.

Figure 4:
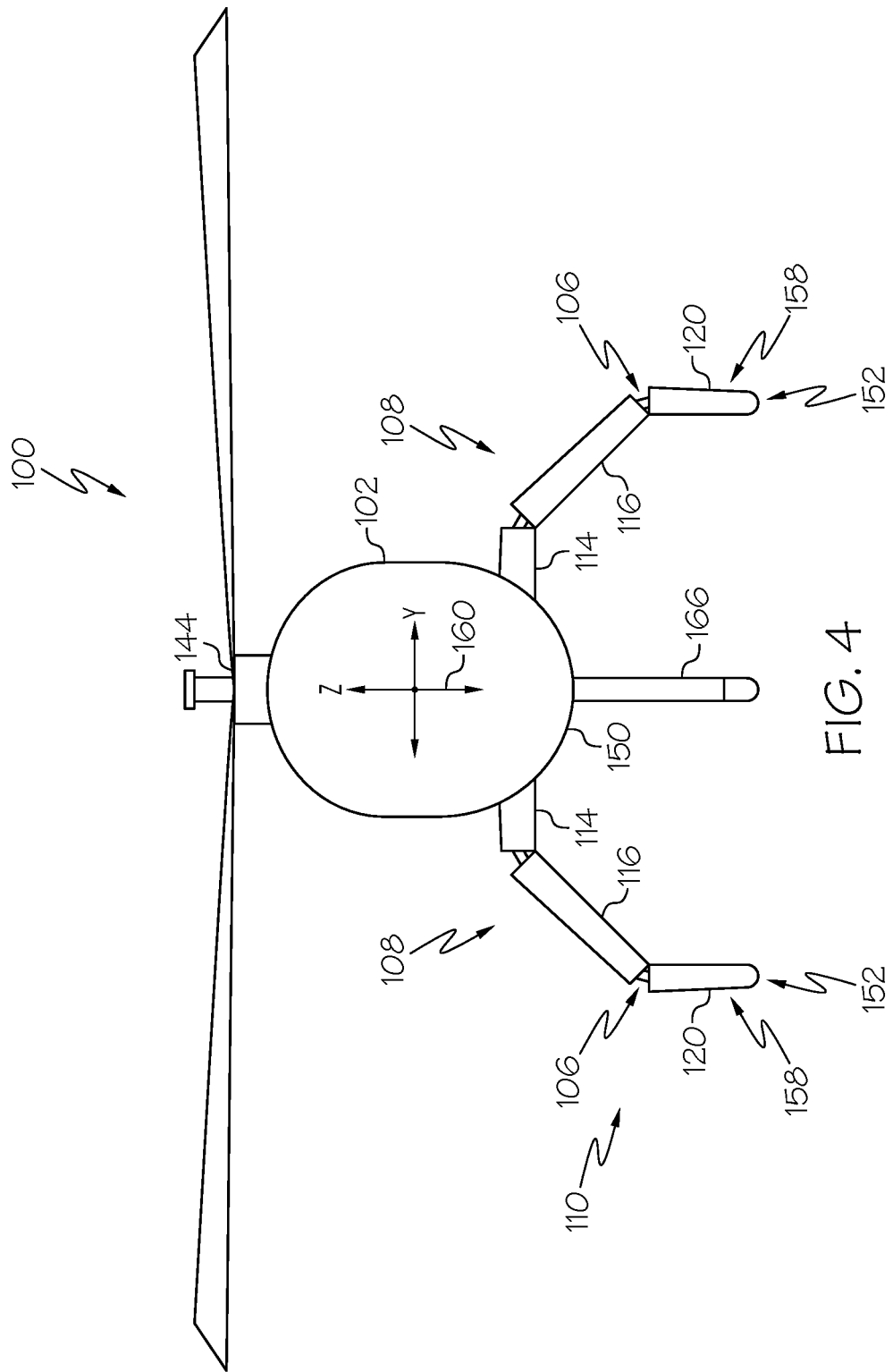
FIG. 4 is a schematic, front elevation view of an example of the vehicle and the apparatus in a ground configuration.
Figure 5:
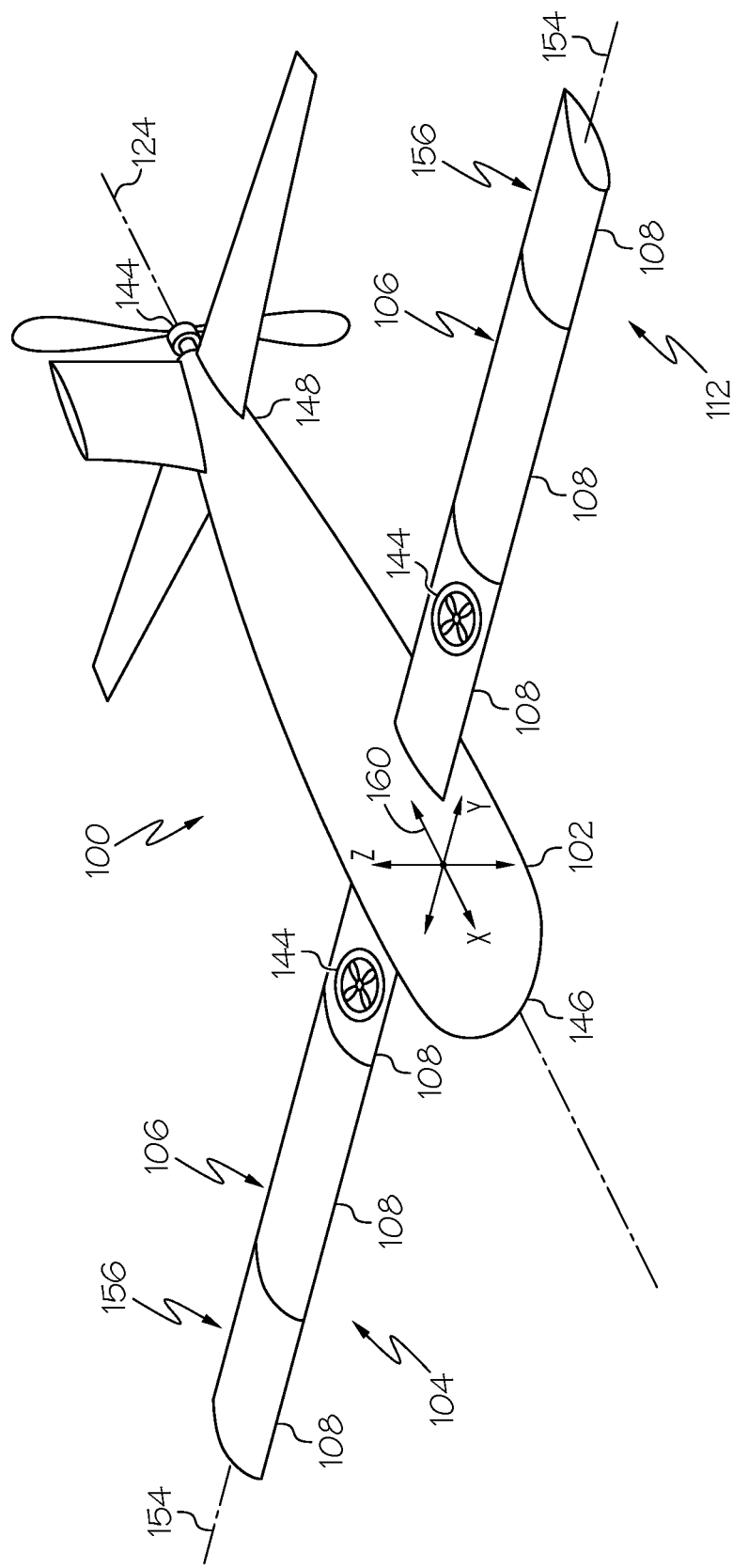
FIG. 5 is a schematic, perspective view of an example of the vehicle and the apparatus in a flight configuration.
Figure 6:
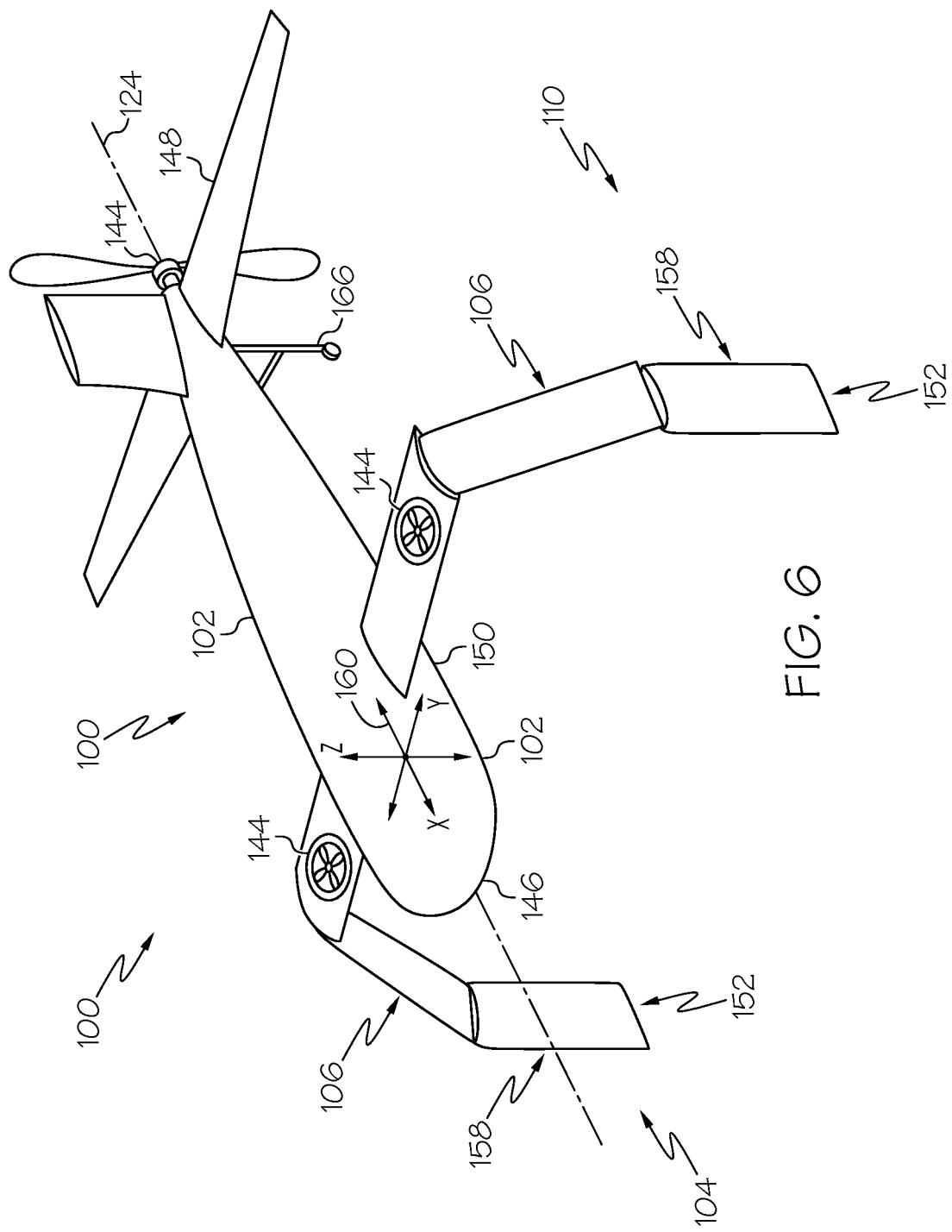
FIG. 6 is a schematic, perspective view of an example of the vehicle and the apparatus in a ground configuration.
Figure 7:
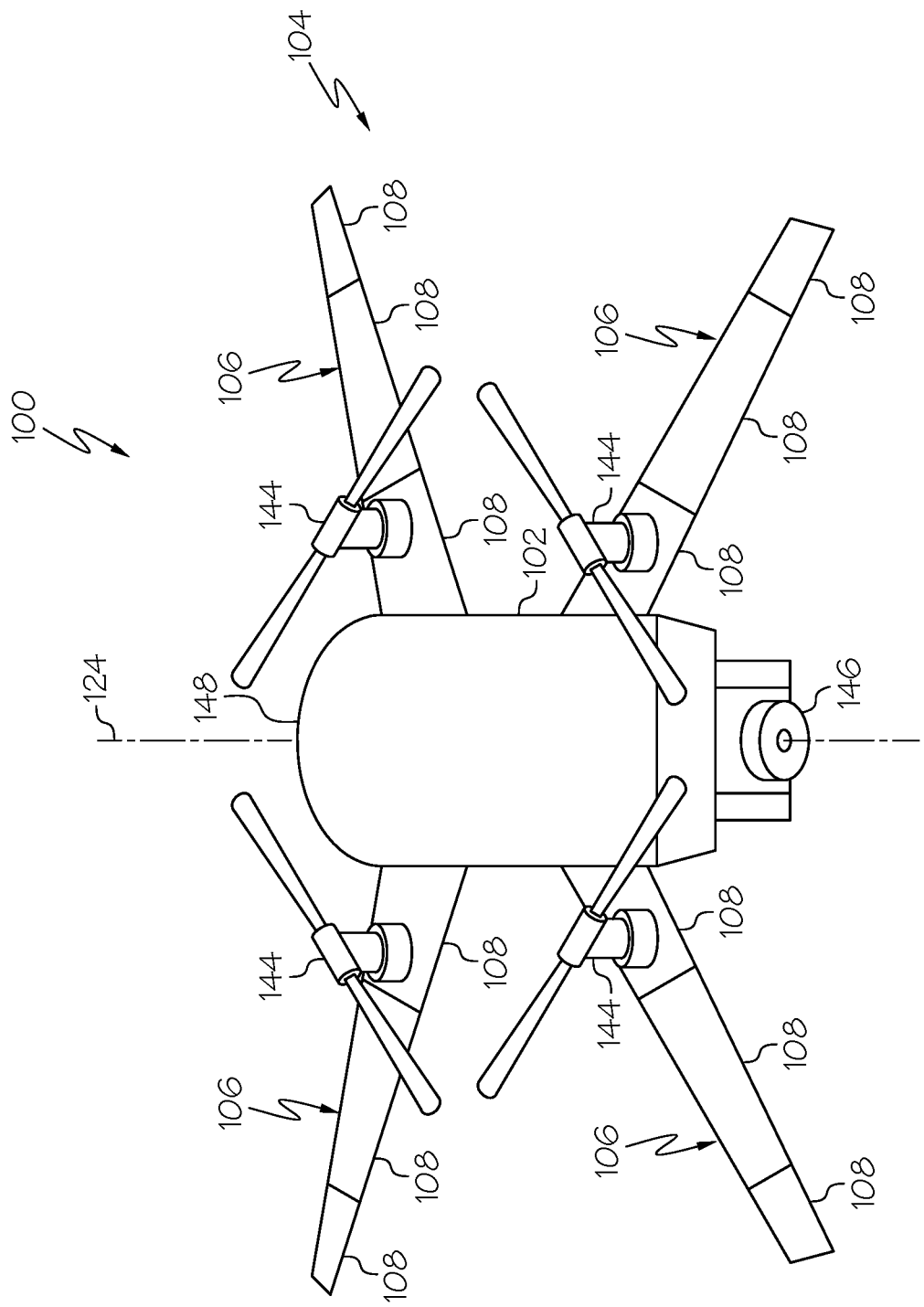
FIG. 7 is a schematic, perspective view of an example of the vehicle and the apparatus in a flight configuration.

Referring to FIGS. 1-9, disclosed are examples of a vehicle 100 and a combination flight and ground apparatus, generally referred to herein as an apparatus 104, for the vehicle 100. The vehicle 100 may be any one of various types of vehicles that are capable of flight, also referred to as flight vehicles. In various examples, the vehicle 100 is an aircraft. In some examples, the vehicle 100 is an airplane. In some example, as illustrated in FIGS. 2-4, 8, and 9, the vehicle 100 is a helicopter or other rotorcraft. In some examples, as illustrated in FIGS. 5-6, the vehicle 100 is another type of vertical takeoff and landing (VTOL) aircraft. In an example, the vehicle 100 is an unmanned aerial vehicle (UAV). In an example, as illustrated in FIG. 7, the vehicle 100 is a drone.

In various examples, the vehicle 100 includes a fuselage 102. The fuselage 102 includes a longitudinal axis 124 and is the main body of the vehicle 100. The fuselage 102 may include any suitable central structure configured to hold a crew, one or more passengers, cargo, other payloads, operational control systems, and the like. The fuselage 102 may have any shape and/or configuration. In various examples, the fuselage 102 includes a nose portion 146 at a forward end of the fuselage 102 and a tail portion 148 at an aft end of the fuselage 102. For the purpose of this disclosure, the terms "forward" and "aft" have their ordinary meaning as known to those skilled in the art and refer to positions relative to a direction of movement of the vehicle 100.

In various examples, the vehicle 100 includes a propulsion system 144. In an example, the propulsion system 144 is operable to generate thrust that moves the vehicle through the air. In an example, the propulsion system 144 is also operable to generate lift that counters the force of gravity. In some examples, as illustrated in FIGS. 2-4 and 7-9, the propulsion system 144 includes one or more rotors that generate lift and thrust for the vehicle 100. In some examples, as illustrated in FIGS. 5 and 6, the propulsion system 144 includes one or more propellers that generate thrust for the vehicle 100. In some examples, as illustrated in FIGS. 5 and 6, the propulsion system 144 also includes one or more ducted fans that generate lift for the vehicle. In some examples, the propulsion system 144 includes one or more turbofan engines that generate thrust for the vehicle 100. The particular configuration of the propulsion system 144, the relative locations of the propulsion system 144 on the vehicle 100, and the manner in which the propulsion system 144 is operably coupled with the vehicle 100 may vary depending, for example, on the type of propulsion system and the type of flight vehicle being implemented. Accordingly, other types and configurations of the propulsion system 144 are also contemplated.

The present disclosure recognizes and takes into account that some flight vehicles, such as rotorcraft, utilize a propulsion system to generate both lift and thrust and that some flight vehicles, such as fixed-wing aircraft, utilize a propulsion system to generate thrust and wings to generate lift. The present disclosure also recognizes and takes into account that all of these flight vehicles utilize some type of landing gear to support the flight vehicle on the ground during takeoff and landing.

Advantageously, the apparatus 104 disclosed herein combines the functionality and operation of flight control surfaces, such as lift-generating wings, and ground-supporting landing gear into a single assembly or mechanism. Accordingly, the disclosed apparatus 104 may also be referred to as a combination assembly of wings and landing gear and the disclosed vehicle 100 may also be referred to as a vehicle with combined wings and landing gear.

In various examples, the apparatus 104 includes at least one articulated appendage 106. In some examples, the vehicle 100 includes at least one pair of the articulated appendages 106. In some examples, as illustrated in FIGS. 2-6, the vehicle 100 includes at a pair of the articulated appendages 106. Each one of the articulated appendages 106 is coupled to the fuselage 102 of the vehicle 100. In an example, an associated pair of the articulated appendages 106 extends from the fuselage 102 at laterally opposed locations of the fuselage 102. Each one of the pair of the articulated appendages 106 is moveable between a ground configuration 110, in which each one of the pair of the articulated appendages 106 supports the vehicle 100 during landing of the vehicle 100, and a flight configuration 112, in which each one of the pair of the articulated appendages 106 produces lift during flight of the vehicle 100.

For the purpose of this disclosure, the ground configuration 110 refers to a condition, configuration, position, and/or orientation of the articulated appendage 106 in which the articulated appendage 106 (each one of the pair of articulated appendages 106) supports the vehicle 100 on a takeoff and landing surface, such as the ground, a landing pad, and the like, during takeoff and/or landing of the vehicle 100.

For the purpose of this disclosure, the flight configuration 112 refers to a condition, configuration, position, and/or orientation of the articulated appendage 106 in which the articulated appendage 106 (each one of the pair of articulated appendages 106) produces lift for the vehicle 100 during flight of the vehicle 100.

Figure 8:
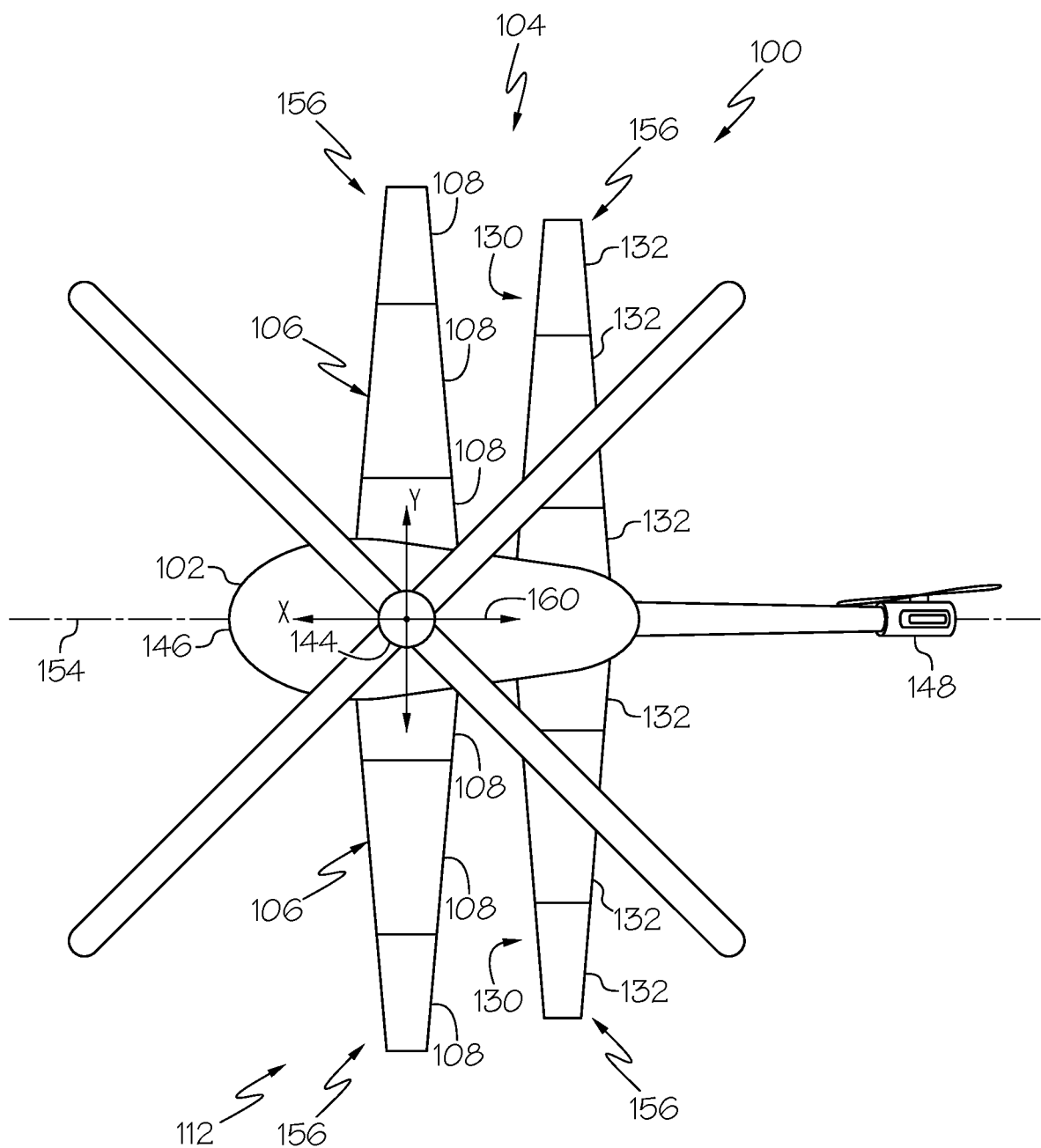
FIG. 8 is a schematic, top plan view of an example of the vehicle and the apparatus.
Figure 9:
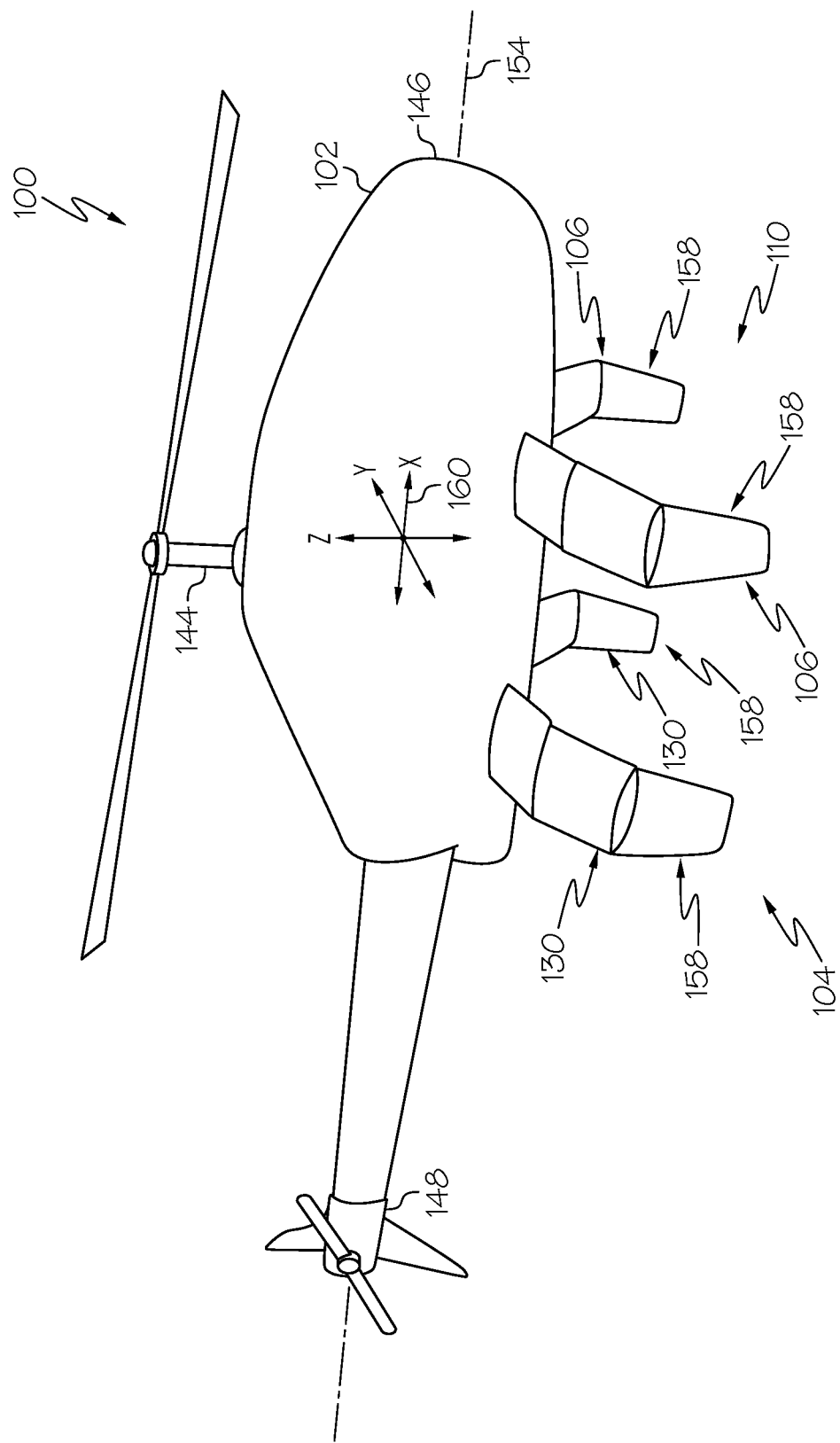
FIG. 9 is a schematic, perspective view of an example of the vehicle and the apparatus.

In some examples, as illustrated in FIGS. 8 and 9, the vehicle 100 includes a pair of second articulated appendages 130. In these examples, each one of the pair of the articulated appendages 106 is a first articulated appendage. Each one of the second articulated appendages 130 is coupled to the fuselage 102. In an example, an associated pair of the second articulated appendages 130 extends from the fuselage 102 at laterally opposed locations of the fuselage 102. Each one of the pair of second articulated appendages 130 is moveable between the ground configuration 110, in which each one of the pair of second articulated appendages 130 supports the vehicle 100 during landing of the vehicle 100, and the flight configuration 112, in which each one of the pair of second articulated appendages 130 produces lift during flight of the vehicle 100.

In some examples, the articulated appendage 106, or each one of the pair of the articulated appendages 106, includes a plurality of airfoil segments 108. The articulated appendage 106, or each one of the articulated appendages 106, is movable between the ground configuration 110 (FIGS. 4 and 6) and the flight configuration 112 (FIGS. 2, 3, 5 and 7).

In some examples, the second articulated appendage 130, or each one of the pair of the second articulated appendages 130, includes a plurality of second airfoil segments 132. The second articulated appendage 130, or each one of the second articulated appendages 130, is movable between the ground configuration 110 (FIG. 9) and the flight configuration 112 (FIG. 8).

For the purpose of this disclosure, the second articulated appendage 130 is substantially similar in structure and function as the articulated appendage 106. Similarly, each one of the plurality of second airfoil segments 132 is substantially similar to each one of the plurality of airfoil segments 108. Accordingly, the examples of the articulated appendage 106 and/or the airfoil segments 108 described herein are also applicable to the second articulated appendage 130 and/or the second airfoil segments 132, respectively.

In examples in which the vehicle 100 includes the pair of articulated appendages 106, as illustrated in FIGS. 3-6, the vehicle 100 may also include a landing strut 166 (FIGS. 4 and 6). With the articulated appendages 106 moved in the ground configuration 110, the landing strut 166 operates with the articulated appendages 106 and serves as a third point of contact to support the vehicle 100 on the takeoff and landing surface during takeoff and/or landing of the vehicle 100. In an example, the landing strut 166 is coupled to the fuselage 102 proximate the tail portion 148, or toward the aft end, of the vehicle 100.

In examples in which the vehicle 100 includes the pair of the articulated appendages 106 and the pair of the second articulated appendages 130, as illustrated in FIGS. 8 and 9, with the articulated appendages 106 moved in the ground configuration 110, the articulated appendages 106 and the second articulated appendages 130 cooperate to serve as four points of contact to support the vehicle 100 on the takeoff and landing surface during takeoff and/or landing of the vehicle 100.

In some examples, as illustrated in FIGS. 4, 6, and 9, with the articulated appendage 106 of the apparatus 104 in the ground configuration 110, or when moving from the flight configuration 112 to the ground configuration 110, at least one of the airfoil segments 108 is pivotally moved relative to an adjacent one of the airfoil segments 108 so that at least a portion of the articulated appendage 106 extends beyond a bottom portion 150 of the fuselage 102 or extends below the fuselage 102 of the vehicle 100. In an example, with the articulated appendages 106 in the ground configuration 110, at least a portion of the articulated appendage 106 is oriented in a downward or approximately vertical position to support the vehicle 100 on a landing or takeoff surface, such as the ground or a landing pad. In an example, at least an outboard end 152 (FIGS. 4 and 6) of the articulated appendage 106 is positioned below the fuselage 102 for contact engagement with the landing or takeoff surface.

For the purpose of this disclosure, the terms "inboard" and "outboard" have their ordinary meaning as known to those skilled in the art and refer to positions relative to a center line, or the longitudinal axis 124, of the vehicle 100. For the purpose of this disclosure, the terms "downward" and "upward" have there ordinary meaning as known to those skilled in the art and refer to positions or directions relative to the vehicle 100 and, more particularly, to a local horizontal plane of the vehicle 100 or the XY-plane of the reference frame 160 of the vehicle 100.

In some example, as illustrated in FIGS. 2, 3, 5, 7, and 8, with the articulated appendage 106 of the apparatus 104 in the flight configuration 112, or when moving from the ground configuration 110 to the flight configuration 112, at least one of the airfoil segments 108 is pivotally moved relative to an adjacent one of the airfoil segments 108 so that the articulated appendage 106 extends outward the fuselage 102 of the vehicle 100. In an example, with the articulated appendages 106 in the flight configuration 112, the articulated appendage 106 is oriented in an outward or approximately horizontal position to generate lift as the vehicle 100 moves through the air.

With the articulated appendages 106 in the ground configuration 110, each one of the articulated appendages 106 acts as or functions as a landing gear, a landing strut, or a landing leg to support the vehicle 100 on the landing or takeoff surface. With the articulated appendages 106 in the flight configuration 112, each one of the articulated appendages 106 acts or functions as a wing to generate lift during flight. Accordingly, the apparatus 104 and, more particularly, the articulated appendages 106 may also be referred to as landing gear 158 (FIGS. 4, 6, and 9) that is configured to be stowed in an approximately horizontal position and that extend outward from the fuselage 102 of the vehicle 100 during flight. Alternatively, the apparatus 104 and, more particularly, the articulated appendages 106 may also be referred to as wings 156 (FIGS. 3, 5, and 8) that are configured to be selectively manipulated to an approximately vertical position and that extend below the fuselage 102 of the vehicle 100 during takeoff and/or landing.

Each one of the airfoil segments 108 has an airfoil-shaped cross section. The particular airfoil shape of each one of the airfoil segments 108 may vary, depending, for example, on the particular aerodynamic force desired to be produced by a corresponding one of the airfoil segments 108 or by the articulated appendage 106 as a whole. In some examples, the airfoil shape of each one of the airfoil segments 108 is one of a semi-symmetrical airfoil, a symmetrical airfoil, flat bottom airfoil, a cambered airfoil, or any other suitable airfoil profile shape in cross-section.

In an example, each one of the airfoil segments 108 has the same airfoil shape. In an example, at least one of the airfoil segments 108 has an airfoil shape that is different than the airfoil shape of at least one other of the airfoil segments 108. In an example, each one of the airfoil segments 108 has a different airfoil shape.

Referring to FIGS. 2-6, 8, and 9, generally, the vehicle 100 has a reference frame 160. The reference frame 160 is a three-dimensional frame of reference having an X-axis, a Y-axis, and a Z-axis and defined with respect to the vehicle 100. In an example, the X-axis of the reference frame 160 may also be referred to as the roll axis or longitudinal axis of the vehicle 100. In some examples, the X-axis of the reference frame 160 is coincident with or parallel to the longitudinal axis 124 of the fuselage 102. In an example, the Y-axis of the reference frame 160 may also be referred to as the pitch axis or the transverse axis of the vehicle 100. In an example, the Z-axis of the reference frame 160 may also be referred to as the yaw axis or vertical axis of the vehicle 100.

Referring to FIGS. 2, 3, 5, and 8, with the articulated appendage 106 in the flight configuration 112, the articulated appendage 106 includes a spanwise axis 154. In some examples, with the articulated appendage 106 in the flight configuration 112, the articulated appendage 106, or the spanwise axis 154 of the articulated appendage 106, is oriented at any one of various angles relative to the local vertical plane (a XZ-plane of the vehicle 100), referred to as the sweep angle of the articulated appendage 106. In an example, with the articulated appendage 106 in the flight configuration 112, the spanwise axis 154 of the articulated appendage 106 is approximately perpendicular to the longitudinal axis 124 of the fuselage 102 when viewed in a local (e.g., virtual) horizontal plane. In other words, in an example, with the articulated appendage 106 in the flight configuration 112, the spanwise axis 154 of the articulated appendage 106 is approximately perpendicular to the X-axis and parallel to the Y-axis of the reference frame 160 of the vehicle 100 when viewed in a XY-plane of the vehicle 100. In an example, with the articulated appendage 106 in the flight configuration 112, the spanwise axis 154 of the articulated appendage 106 is oblique to the longitudinal axis 124 of the fuselage 102 when viewed in the local horizontal plane. In other words, in an example, with the articulated appendage 106 in the flight configuration 112, the spanwise axis 154 of the articulated appendage 106 is oblique to the X-axis and oblique to the Y-axis of the reference frame 160 of the vehicle 100 when viewed in the XY-plane of the vehicle 100. The angular orientation of the spanwise axis 154 relative to the longitudinal axis 124 of the fuselage 102 may depend, for example, to the structural design of the articulated appendage 106, a sweep angle of the articulated appendage 106 relative to the fuselage 102, and other factors.

In some examples, with the articulated appendage 106 in the flight configuration 112, the articulated appendage 106, or the spanwise axis 154 of the articulated appendage 106, is oriented at any one of various angles relative to the local horizontal plane (the XY-plane of the vehicle 100), referred to as the dihedral angle of the articulated appendage 106. In an example, with the articulated appendage 106 in the flight configuration 112, the articulated appendage 106 has a neutral dihedral angle in which an inboard end 162 of the articulated appendage 106, or the spanwise axis 154 of the articulated appendage 106, and the outboard end 152 of the articulated appendage 106, or the spanwise axis 154 of the articulated appendage 106, are approximately positioned within the local horizontal plane. In an example, with the articulated appendage 106 in the flight configuration 112, the articulated appendage 106 has a positive dihedral angle in which an outboard end 152 of the articulated appendage 106, or the spanwise axis 154 of the articulated appendage 106, is positioned above the inboard end 162 of the articulated appendage 106, or the spanwise axis 154 of the articulated appendage 106, relative to the local horizontal plane. In an example, with the articulated appendage 106 in the flight configuration 112, the articulated appendage 106 has a negative dihedral angle in which an outboard end 152 of the articulated appendage 106, or the spanwise axis 154 of the articulated appendage 106, is positioned below the inboard end 162 of the articulated appendage 106, or the spanwise axis 154 of the articulated appendage 106, relative to the local horizontal plane.

In examples in which the vehicle 100 includes the pair of articulate appendages 106 and the pair of second articulates appendages 130, the relative locations of the pair of articulate appendages 106 and the pair of second articulates appendages 130 along the X-axis of the reference frame 160 of the vehicle 100 relative to the fuselage 102 are different. For example, the pair of second articulates appendages 130 may be located in an aft location of the fuselage 102 relative to the pair of articulates appendages 106.

In some examples in which the vehicle 100 includes the pair of articulate appendages 106 and the pair of second articulates appendages 130, the relative locations of the pair of articulate appendages 106 and the pair of second articulates appendages 130 along the Z-axis of the reference frame 160 of the vehicle 100 relative to the fuselage 102 are the same. In some examples in which the vehicle 100 includes the pair of articulate appendages 106 and the pair of second articulates appendages 130, the relative locations of the pair of articulate appendages 106 and the pair of second articulates appendages 130 along the Z-axis of the reference frame 160 of the vehicle 100 relative to the fuselage 102 are different. For example, the pair of second articulates appendages 130 may be located above or below the pair of articulates appendages 106.

In some examples in which the vehicle 100 includes the pair of articulate appendages 106 and the pair of second articulates appendages 130, the sweep angle and/or the dihedral angle of the pair of articulate appendages 106 and the pair of second articulates appendages 130 are the same. In some examples in which the vehicle 100 includes the pair of articulate appendages 106 and the pair of second articulates appendages 130, at least one of the sweep angle and/or the dihedral angle of the pair of articulate appendages 106 and the pair of second articulates appendages 130 is different.

With the articulated appendage 106 in the flight configuration 112, the articulated appendage 106 has an airfoil-shaped cross section at any location along the spanwise axis 154. The airfoil shape of the articulated appendage 106 is defined by the airfoil shape of each one of the airfoil segments 108. In an example, the articulated appendage 106 has a constant airfoil shape along the spanwise axis 154. In an example, the articulated appendage 106 has a variable airfoil shape along the spanwise axis 154.

Generally, the airfoil shape of the articulated appendage 106, when in the flight configuration 112, or any one of the airfoil segments 108 is designed to produce a favorable lift-to-drag ratio as the vehicle 100 moves through the air. Accordingly, the disclosed apparatus 104 advantageously offsets the weight penalty and/or drag of the articulated appendages 106, which are selectively utilized as landing gear 158, by stowing the articulated appendages 106 in such a manner that the articulated appendages 106 generate lift during flight or, in other words, by selectively utilizing the articulated appendages 106 as wings 156.

Referring to FIGS. 10-13, in an example, the plurality of airfoil segments 108 of each one of the articulated appendages 106 includes an inboard airfoil segment 114, an intermediate airfoil segment 116, and an outboard airfoil segment 120. In an example, the inboard airfoil segment 114 is coupled to the fuselage 102 of the vehicle 100. In an example, the intermediate airfoil segment 116 is pivotally coupled with the inboard airfoil segment 114 along a first pivot axis 118 (FIG. 10), or inboard pivot axis. The articulated appendages 106 is configured to selectively pivotally move the intermediate airfoil segment 116 about the first pivot axis 118 relative to the inboard airfoil segment 114. In an example, the outboard airfoil segment 120 is pivotally coupled with the intermediate airfoil segment 116 along a second pivot axis 122 (FIG. 10), or outboard pivot axis. The articulated appendages 106 is configured to selectively pivotally move the outboard airfoil segment 120 about the second pivot axis 122 relative to the intermediate airfoil segment 116.

In some examples, as illustrated in FIGS. 10-13, the articulated appendage 106 includes two points of articulation defined by the first pivot axis 118 and the second pivot axis 122. In some other examples, the articulated appendage 106 has more than two points of articulations defined by additional pivot axes. In an example, the plurality of airfoil segments 108 of each one of the articulated appendages 106 may include more than one intermediate airfoil segment 116, or additional intermediate airfoil segments, located coupled between the inboard airfoil segment 114 and the outboard airfoil segment 120 and pivotally coupled with the inboard airfoil segment 114, the outboard airfoil segment 120, or an adjacent one of the additional intermediate airfoil segments along additional pivot axes.

In an example, the inboard airfoil segment 114 is fixed relative to the fuselage 102 of the vehicle 100. Fixing the inboard airfoil segment 114 to the fuselage 102, at the inboard end 162, or root, of the articulated appendage 106, provides additional structural support and load bearing capacity to the articulated appendage 106. The inboard airfoil segment 114 also spaces the intermediate airfoil segment 116 away from the fuselage 102 and locates the first pivot axis 118 outward from the fuselage 102 so that the intermediate airfoil segment 116 has a larger range of motion when pivotally moved about the first pivot axis 118, such as when moving the articulated appendage 106 into the ground configuration 110.

Generally, the dimensions of the articulated appendages 106, such as a length or spanwise dimension and/or a width or chordwise dimension of any one of the articulated appendages 106, any one of the airfoil segments 108, any one of a plurality of spanwise structural components 138 (FIG. 31) forming the articulated appendage 106, and/or any one of a plurality of chordwise structural components 140 (FIG. 31) forming the articulated appendage 106 may vary, for example, by design, by desired aerodynamic performance, such as lift-to-drag ratio (e.g., when utilized as wings 156), by required load bearing capacity (e.g., when utilized as wings 156 and/or as landing gear 158), and other factors. Similarly, the relative locations of the first pivot axis 118 and/or the second pivot axis 122 along the length of the articulated appendage 106 may also vary. Generally, an increase in the distance between the first pivot axis 118 and the second pivot axis 122 (e.g., length of the intermediate airfoil segment 116) and/or the distance between the second pivot axis 122 and the outboard end 152 of the articulated appendage 106 (e.g., length of the outboard airfoil segment 120) may result in larger mechanical stress on the load-bearing structure of the articulated appendage 106 during flight and takeoff and landing. In some examples, maximum lengths may be defined by a trade off between wing-span and structure of the articulated appendage 106 that corresponds to a larger lift-to-drag ratio. In some examples, minimum lengths may be defined by the airfoil segments 108 being able to fold in a manner that enables the articulated appendage 106 to support the weight of the vehicle 100 and provide a sufficient (e.g., minimum) lift-to-drag ratio.

Figure 12:
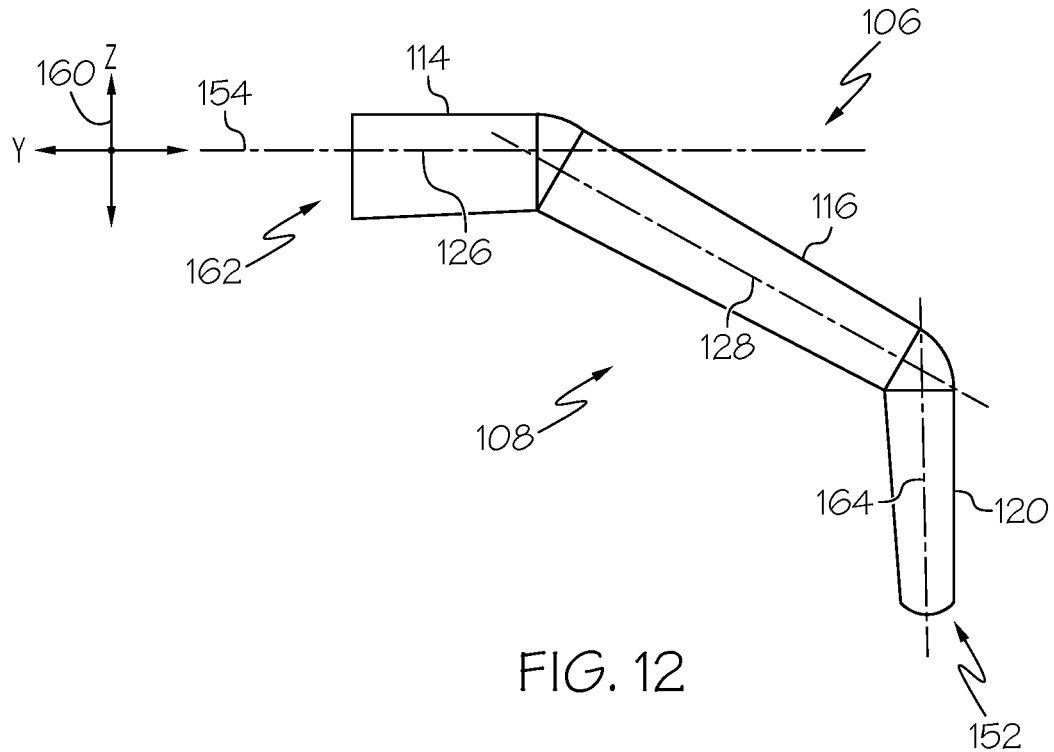
FIG. 12 is a schematic, elevation view of an example of the articulated appendage of the apparatus.
Figure 13:
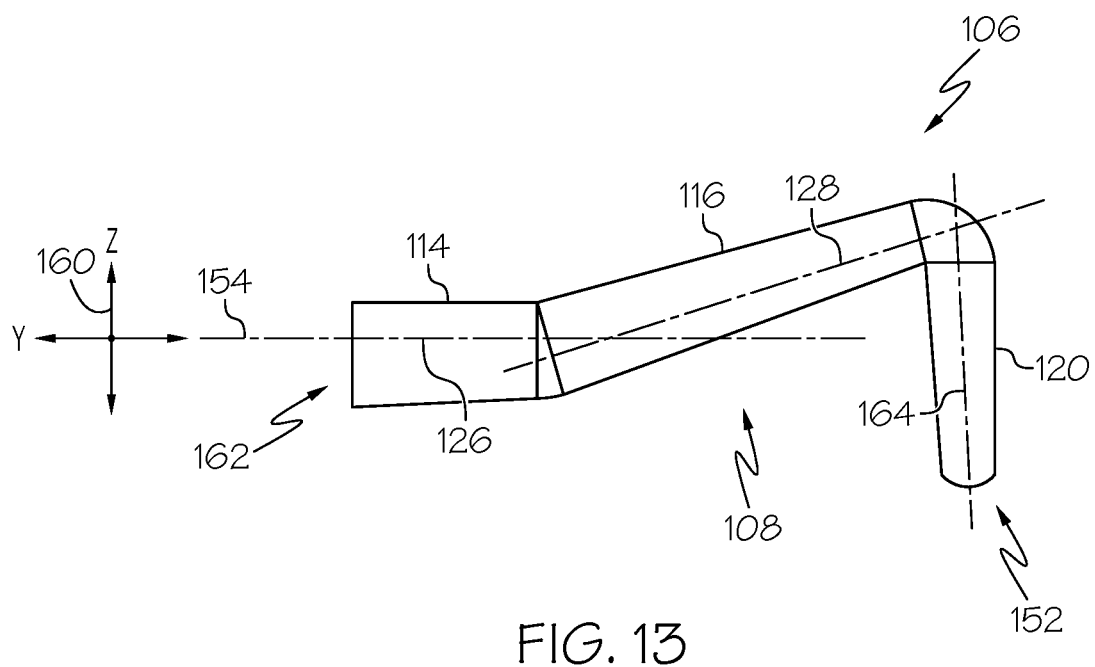
FIG. 13 is a schematic, elevation view of an example of the articulated appendage of the apparatus.

In an example, the intermediate airfoil segment 116 is pivotally movable about the first pivot axis 118 relative to the inboard airfoil segment 114 in an upward direction and a downward direction. In an example, as illustrated in FIG. 12, with the intermediate airfoil segment 116 pivotally moved about the first pivot axis 118 relative to the inboard airfoil segment 114, or the local horizontal plane (the XY-plane of the vehicle 100), in the downward direction, the intermediate airfoil segment 116 is positioned at a negative angular orientation relative to the inboard airfoil segment 114, or the local horizontal plane. In an example, as illustrated in FIG. 13, with the intermediate airfoil segment 116 pivotally moved about the first pivot axis 118 relative to the inboard airfoil segment 114, or the local horizontal plane, in the upward direction, the intermediate airfoil segment 116 is positioned at a positive angular orientation relative to the inboard airfoil segment 114, or the local horizontal plane.

In some examples, the intermediate airfoil segment 116 is positioned at any one of various angular orientations relative to the inboard airfoil segment 114, or the local horizontal plane. In an example, the range of pivotal motion of the intermediate airfoil segment 116 relative to the inboard airfoil segment 114, or local horizontal plane, is up to approximately 180-degrees (e.g., approximately 90-degrees above the local horizontal plane and approximately 90-degrees below the local horizontal plane).

In an example, the outboard airfoil segment 120 is pivotally movable about the second pivot axis 122 relative to the intermediate airfoil segment 116 in an upward direction and a downward direction. In an example, with the outboard airfoil segment 120 pivotally moved about the second pivot axis 122 relative to the intermediate airfoil segment 116 in the downward direction, the outboard airfoil segment 120 is positioned at a negative angular orientation relative to the intermediate airfoil segment 116. In an example, with the outboard airfoil segment 120 pivotally moved about the second pivot axis 122 relative to the intermediate airfoil segment 116 in the upward direction, the outboard airfoil segment 120 is positioned at a positive angular orientation relative to the intermediate airfoil segment 116.

The intermediate airfoil segment 116 being pivotally movable about the first pivot axis 118 relative to the inboard airfoil segment 114 in the upward direction and the downward direction and the outboard airfoil segment 120 being pivotally movable about the second pivot axis 122 relative to the intermediate airfoil segment 116 in the upward direction and the downward direction provides a large range of pivotal motion to the articulated appendages 106 when in the ground configuration 110 and the flight configuration 112.

In an example, the inboard airfoil segment 114 includes an inboard spanwise axis 126. In an example, the intermediate airfoil segment 116 includes an intermediate spanwise axis 128. In an example, the outboard airfoil segment 120 includes an outboard spanwise axis 164.

In an example, the inboard spanwise axis 126 is coincident with or parallel to the spanwise axis 154 of the articulated appendage 106. In examples in which the inboard airfoil segment 114 is fixed to the fuselage 102, the angular orientation of the inboard spanwise axis 126 relative to the spanwise axis 154 of the articulated appendage 106 is fixed.

Referring to FIGS. 12-15, in some examples, with the articulated appendage 106 in the ground configuration 110, the intermediate spanwise axis 128 is oriented at a non-zero angle relative to and intersects the inboard spanwise axis 126 (e.g., not coincident with or parallel to the inboard spanwise axis 126). In some examples, with the articulated appendage 106 in the ground configuration 110, the outboard spanwise axis 164 is oriented at a non-zero angle relative to and intersects the intermediate spanwise axis 128 (e.g., not coincident with or parallel to the intermediate spanwise axis 128).

Figure 14:
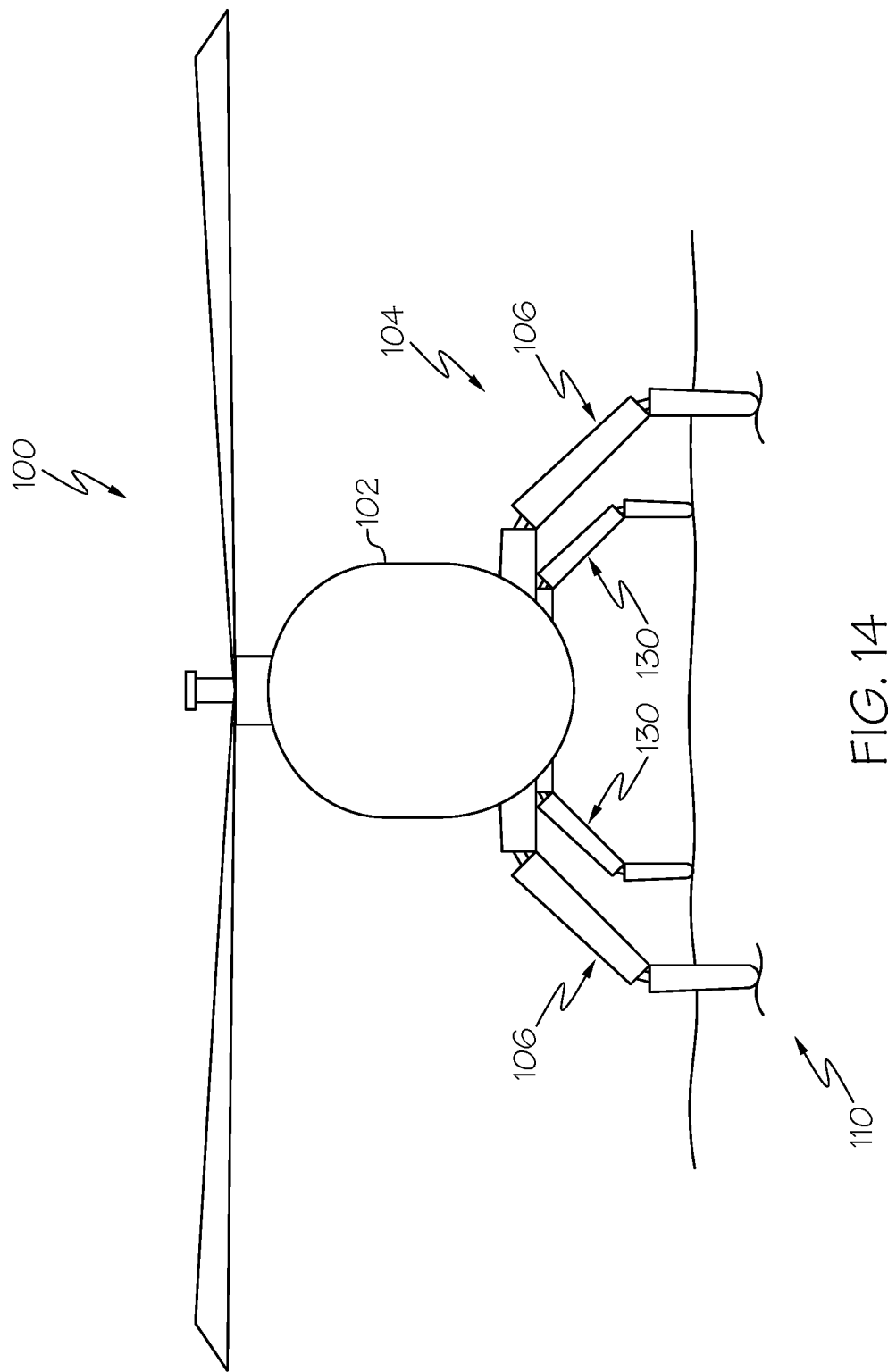
FIG. 14 is a schematic, front elevation view of an example of the vehicle and the apparatus in a ground configuration.
Figure 15:
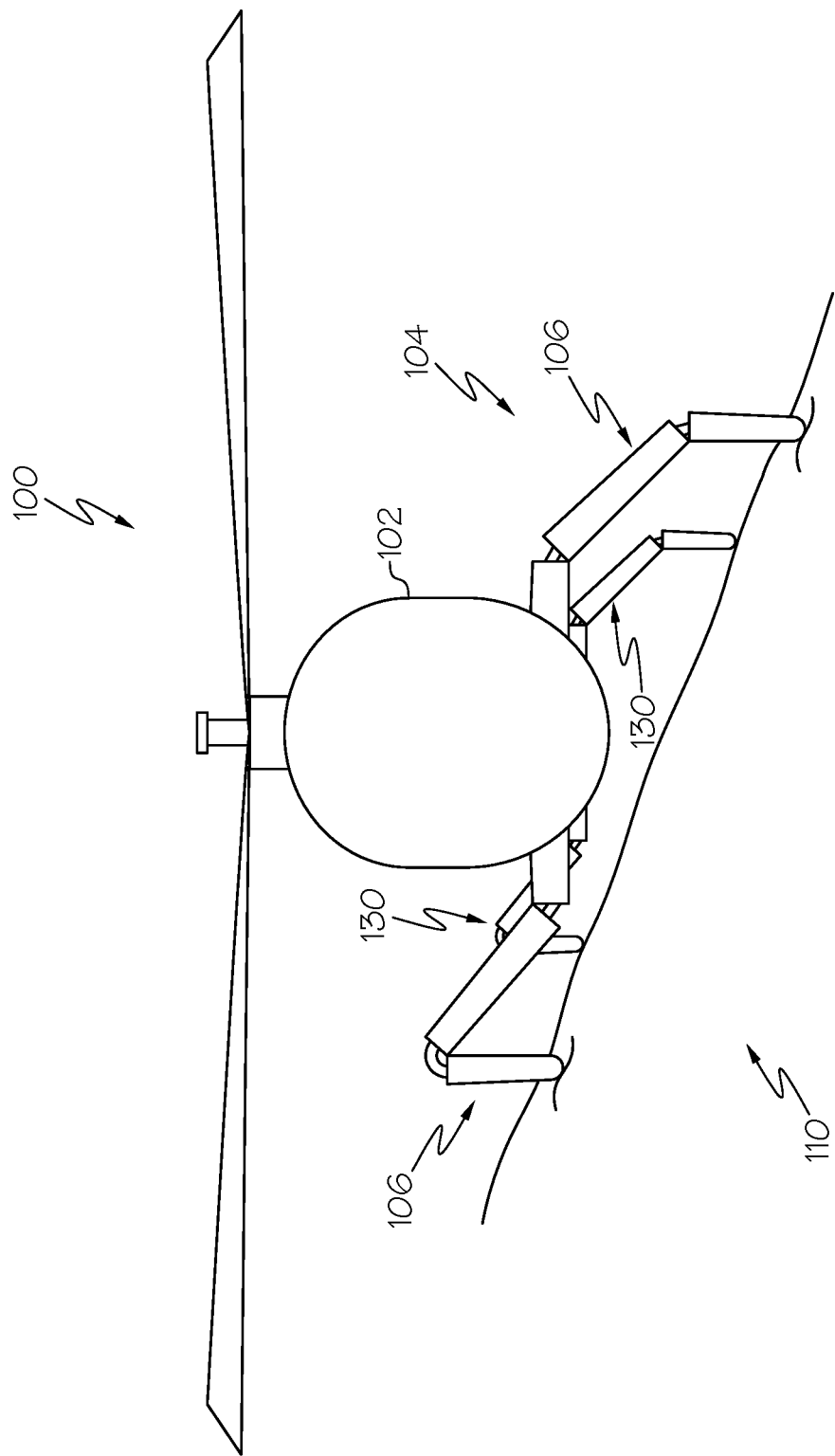
FIG. 15 is a schematic, front elevation view of an example of the vehicle and the apparatus in a ground configuration.

FIGS. 14 and 15 schematically illustrate examples of vehicle 100 in which the articulated appendages 106 are in the ground configuration 110, or operating as landing gear 158. Pivotal movement of the intermediate airfoil segment 116 and the outboard airfoil segment 120 positions the articulated appendage 106 in the ground configuration 110 so that the outboard airfoil segment 120 is positioned in an approximately vertical orientation, or approximately perpendicular to the local horizontal plane of the vehicle 100.

In some circumstances, as illustrated in FIG. 14, the takeoff and landing surface may be generally horizontal. In these circumstances, when the articulated appendages 106 are moved to the ground configuration 110, the airfoil segments 108 of each one of the articulated appendages 106 may be pivotally moved to approximately the same orientation relative to the vehicle 100.

In an example, the intermediate airfoil segment 116 of each one of the articulated appendages 106 is pivotally moved in a downward direction relative to the inboard airfoil segment 114 so that a portion of the articulated appendage 106 extends below the fuselage 102. For example, the intermediate airfoil segment 116 is pivotally moved in a downward direction relative to the inboard airfoil segment 114 to position at least a portion of the outboard airfoil segment 120 below the fuselage 102. Further, the outboard airfoil segment 120 of each one of the articulated appendages 106 is pivotally moved in a downward direction (e.g., toward the vehicle 100) so that a portion of the articulated appendage 106 extends below the fuselage 102 and the outboard end 152 of the articulated appendage 106 is positioned to make contact with the takeoff and landing surface. For example, the outboard airfoil segment 120 is pivotally moved in a downward direction to position the outboard airfoil segment 120 in an approximately vertical orientation or approximately normal to the takeoff and landing surface.

In some circumstances, as illustrated in FIG. 15, the takeoff and landing surface may not be generally horizontal or may have varying degrees of slope. In these circumstances, when the articulated appendages 106 are moved to the ground configuration 110, the airfoil segments 108 of one or more of the articulated appendages 106 may be pivotally moved to different orientations relative to the vehicle 100 to maintain the upright orientation of the vehicle 100.

In an example, the intermediate airfoil segment 116 of one of the articulated appendages 106 is pivotally moved in an upward direction relative to the inboard airfoil segment 114 so that a portion of the articulated appendage 106 extends below the fuselage 102 at an upper (e.g., uphill) portion of the sloped takeoff and landing surface. For example, the intermediate airfoil segment 116 is pivotally moved in an upward direction relative to the inboard airfoil segment 114 to position at least a portion of the outboard airfoil segment 120 below the fuselage 102. Further, the outboard airfoil segment 120 of each one of the articulated appendages 106 is pivotally moved in a downward direction (e.g., toward the vehicle 100) so that a portion of the articulated appendage 106 extends below the fuselage 102 and the outboard end 152 of the articulated appendage 106 is positioned to make contact with the takeoff and landing surface. For example, the outboard airfoil segment 120 is pivotally moved in a downward direction to position the outboard airfoil segment 120 approximately normal to the upper portion of the sloped takeoff and landing surface.

In an example, the intermediate airfoil segment 116 of a laterally opposed one of the articulated appendages 106 is pivotally moved in a downward direction relative to the inboard airfoil segment 114 so that a portion of the articulated appendage 106 extends below the fuselage 102 at a lower (e.g., downhill) portion of the sloped takeoff and landing surface. For example, the intermediate airfoil segment 116 is pivotally moved in a downward direction relative to the inboard airfoil segment 114 to position at least a portion of the outboard airfoil segment 120 below the fuselage 102. Further, the outboard airfoil segment 120 of each one of the articulated appendages 106 is pivotally moved in a downward direction (e.g., toward the vehicle 100) so that a portion of the articulated appendage 106 extends below the fuselage 102 and the outboard end 152 of the articulated appendage 106 is positioned to make contact with the takeoff and landing surface. For example, the outboard airfoil segment 120 is pivotally moved in a downward direction to position the outboard airfoil segment 120 approximately normal to the lower portion of the sloped takeoff and landing surface.

Figure 10:
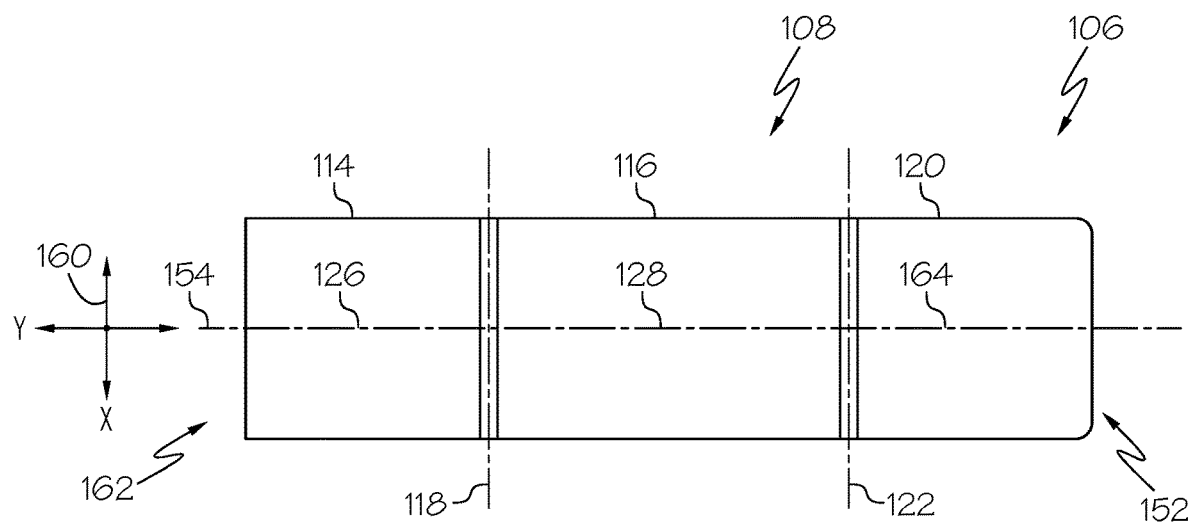
FIG. 10 is a schematic, plan view of an example of an articulated appendage of the apparatus.
Figure 11:
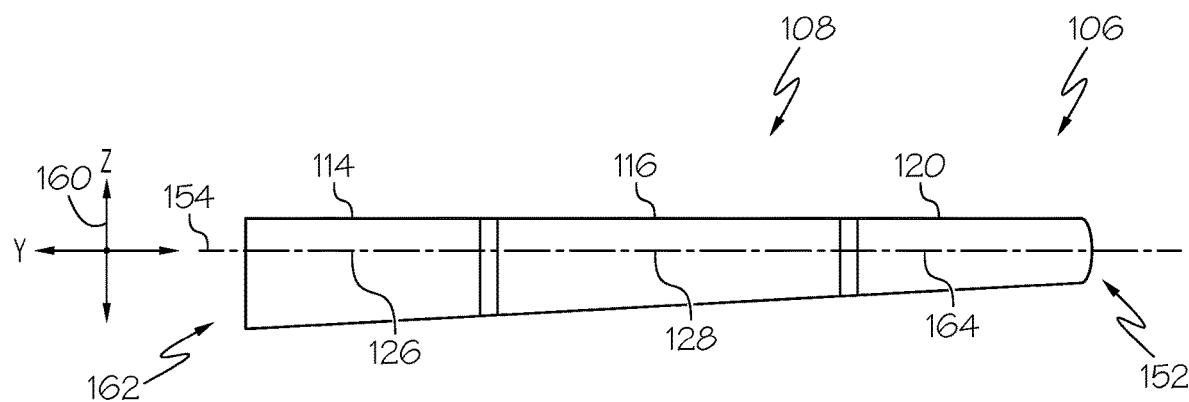
FIG. 11 is a schematic, elevation view of an example of the articulated appendage of the apparatus.
Figure 16:
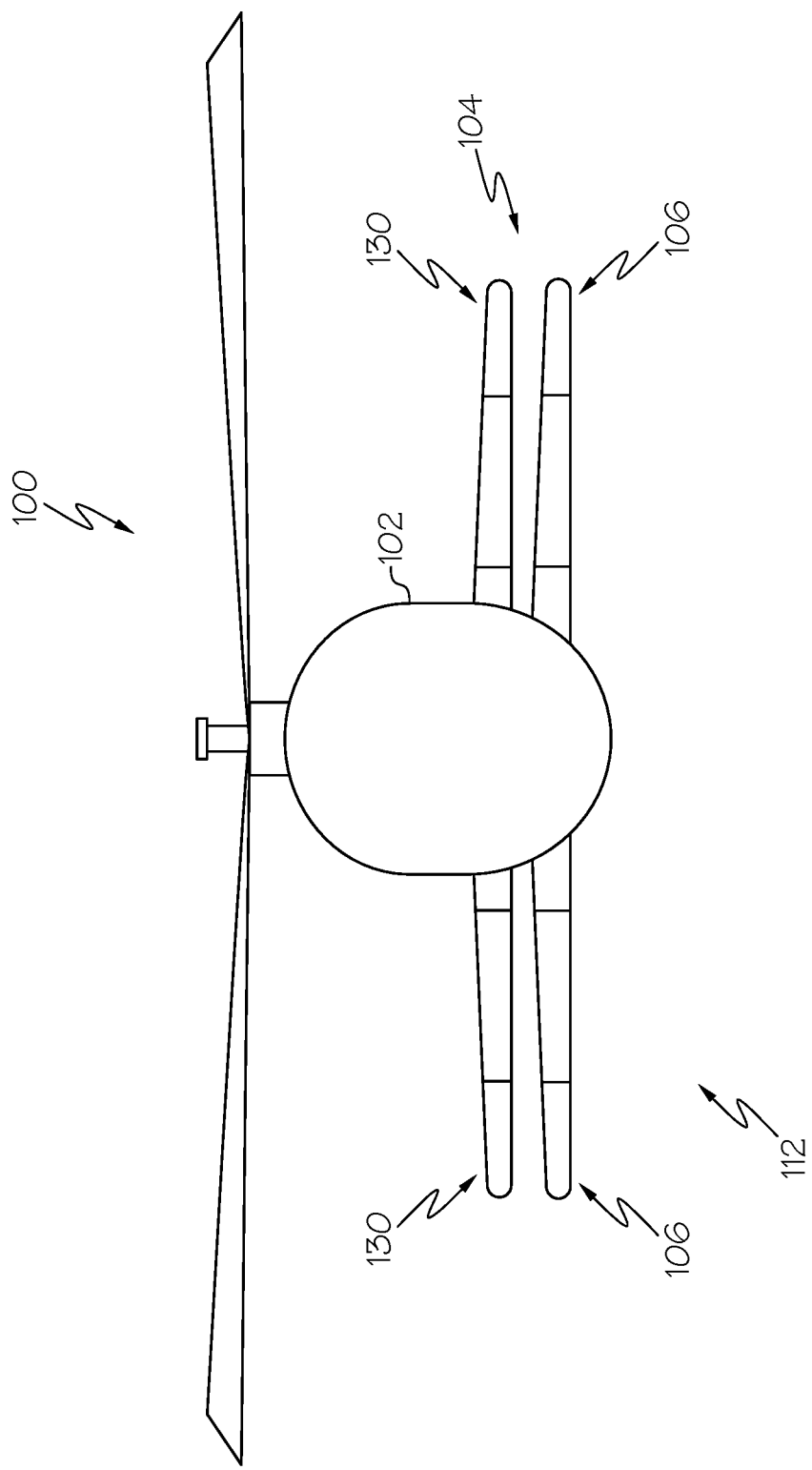
FIG. 16 is a schematic, front elevation view of an example of the vehicle and the apparatus in a flight configuration.
Figure 17:
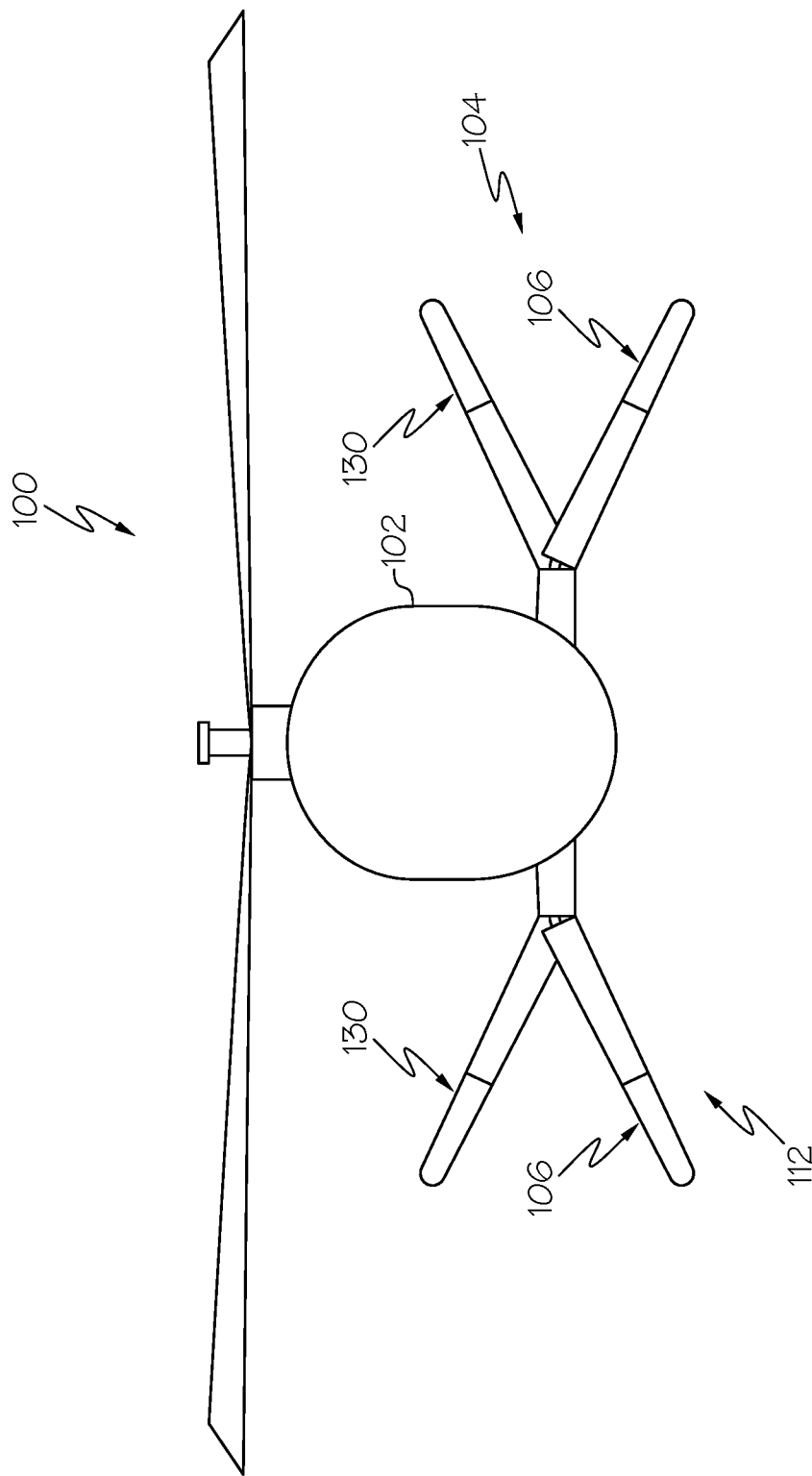
FIG. 17 is a schematic, front elevation view of an example of the vehicle and the apparatus in a flight configuration.
Figure 18:
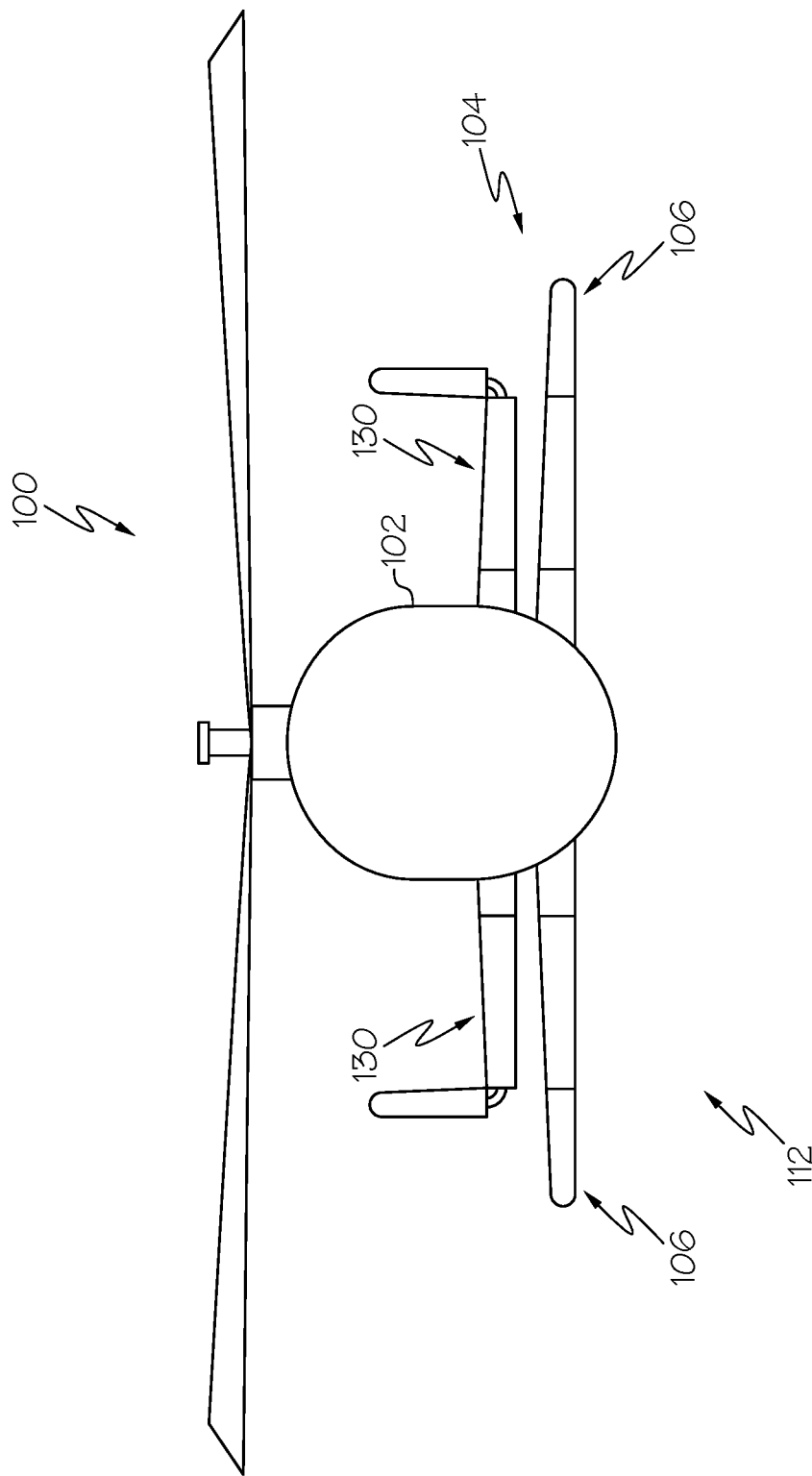
FIG. 18 is a schematic, front elevation view of an example of the vehicle and the apparatus in a flight configuration.
Figure 19:
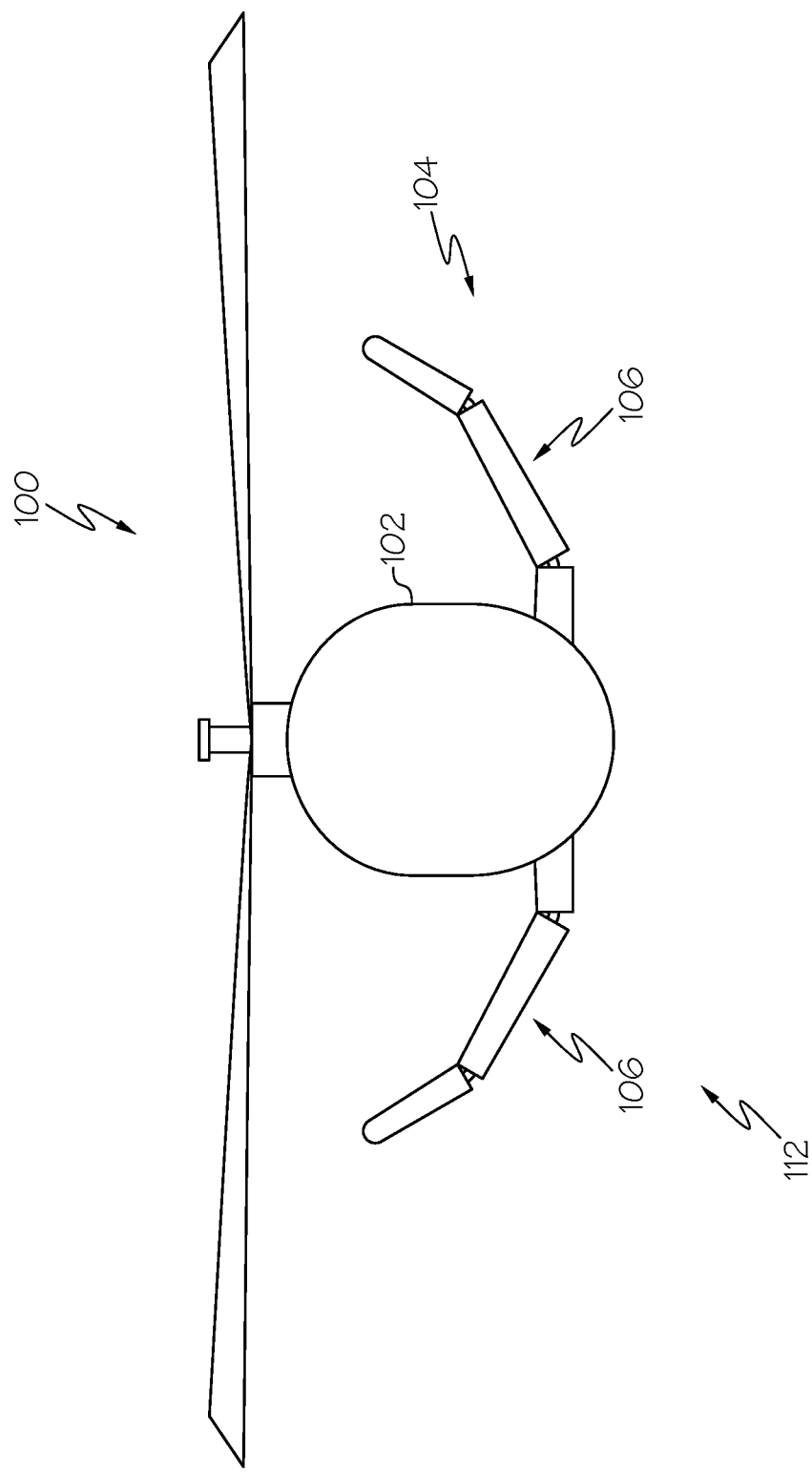
FIG. 19 is a schematic, front elevation view of an example of the vehicle and the apparatus in a flight configuration.

Referring to FIGS. 10, 11, and 16-19, in some examples, with the articulated appendage 106 in the flight configuration 112, the intermediate spanwise axis 128 is coincident with or parallel to the inboard spanwise axis 126. In some examples, with the articulated appendage 106 in the flight configuration 112, the outboard spanwise axis 164 is coincident with or parallel to the intermediate spanwise axis 128. In some examples, with the articulated appendage 106 in the flight configuration 112, both of the intermediate spanwise axis 128 and the outboard spanwise axis 164 are coincident with or parallel to the inboard spanwise axis 126, as illustrated in FIGS. 10, 11, and 16. In some examples, with the articulated appendage 106 in the flight configuration 112, the intermediate spanwise axis 128 is oriented at a non-zero angle relative to and intersects the inboard spanwise axis 126 and the outboard spanwise axis 164 is coincident with or parallel to the intermediate spanwise axis 128, as illustrated in FIG. 17. In some examples, with the articulated appendage 106 in the flight configuration 112, the intermediate spanwise axis 128 is coincident with or parallel to the inboard spanwise axis 126 and the outboard spanwise axis 164 is oriented at a non-zero angle relative to and intersects the intermediate spanwise axis 128, as illustrated in FIG. 18. In some examples, with the articulated appendage 106 in the flight configuration 112, the intermediate spanwise axis 128 is oriented at a non-zero angle relative to and intersects the inboard spanwise axis 126 and the outboard spanwise axis 164 is oriented at a non-zero angle relative to and intersects the intermediate spanwise axis 128, as illustrated in FIG. 19.

FIGS. 16-19 schematically illustrate examples of the vehicle 100 in which the articulated appendages 106 are in the flight configuration 112, or operating as wings 156. Pivotal movement of the intermediate airfoil segment 116 and the outboard airfoil segment 120 positions the articulated appendage 106 in the flight configuration 112 so that at least one of the intermediate airfoil segment 116 and the outboard airfoil segment 120 is positioned in an approximately horizontal orientation.

In some circumstances, as illustrated in FIGS. 16-19, it may be desirable to adjust an angular orientation of one or more of the articulated appendages 106 or a portion of one or more of the articulated appendages 106 during flight, i.e., with the articulated appendages 106 in the flight configuration 112. In these circumstances, one or more of the airfoil segments 108 may be pivotally moved relative to an adjacent one of the airfoil segments 108 to modify the aerodynamic characteristics of a corresponding one of the articulated appendages 106.

In an example, as illustrated in FIG. 16, the intermediate airfoil segment 116 and the outboard airfoil segment 120 are pivotally moved so that the articulated appendage 106 extends outward from the fuselage 102 and the intermediate airfoil segment 116 and the outboard airfoil segment 120 are in an approximately horizontal orientation.

In an example, as illustrated in FIG. 17, the intermediate airfoil segment 116 is pivotally moved relative to the inboard airfoil segment 114 in an upward direction to position the intermediate airfoil segment 116 and the outboard airfoil segment 120 at a positive dihedral angle so that the outboard end 152 of the articulated appendage 106 positioned above the inboard end 162 of the articulated appendage 106. Alternatively, in an example, as illustrated in FIG. 17, the intermediate airfoil segment 116 is pivotally moved relative to the inboard airfoil segment 114 in a downward direction to position the intermediate airfoil segment 116 and the outboard airfoil segment 120 at a negative dihedral angle so that the outboard end 152 of the articulated appendage 106 positioned below the inboard end 162 of the articulated appendage 106.

In an example, as illustrated in FIG. 18, the outboard airfoil segment 120 is pivotally moved relative to the intermediate airfoil segment 116 in an upward direction to position the outboard airfoil segment 120 in an approximately vertical orientation. In an example, as illustrated in FIG. 18, the outboard airfoil segment 120 is pivotally moved relative to the intermediate airfoil segment 116 in a downward direction to position the outboard airfoil segment 120 in an approximately vertical orientation. In these examples, the outboard airfoil segment 120 may serve as a vertical stabilizer of the vehicle 100. In an example, the outboard airfoil segment 120 of each one of the pair of second articulated appendages 130 (the pair of articulated appendages that are located toward or proximate the aft end of the vehicle 100) is pivotally moved relative to the intermediate airfoil segment 116 in an upward direction to position the outboard airfoil segment 120 in an approximately vertical orientation so that the vehicle 100 has a twin tail, or H-tail, configuration.

In an example, the outboard airfoil segment 120 is pivotally moved relative to the intermediate airfoil segment 116 in an upward direction to position the outboard airfoil segment 120 in an orientation between vertical and horizontal. In this example, the outboard airfoil segment 120 may serve as the vertical stabilizer of the vehicle 100. In an example, the outboard airfoil segment 120 of each one of the pair of second articulated appendages 130 (the pair of articulated appendages that are located toward or proximate the aft end of the vehicle 100) is pivotally moved relative to the intermediate airfoil segment 116 in an upward direction to position the outboard airfoil segment 120 in an orientation between vertical and horizontal so that the vehicle 100 has a V-tail configuration.

In an example, as illustrated in FIG. 19, the intermediate airfoil segment 116 is pivotally moved relative to the inboard airfoil segment 114 in an upward direction and the outboard airfoil segment 120 is pivotally moved relative to the intermediate airfoil segment 116 in an upward direction so that the articulated appendage 106 has an arcuate or curved profile.

Figure 20:
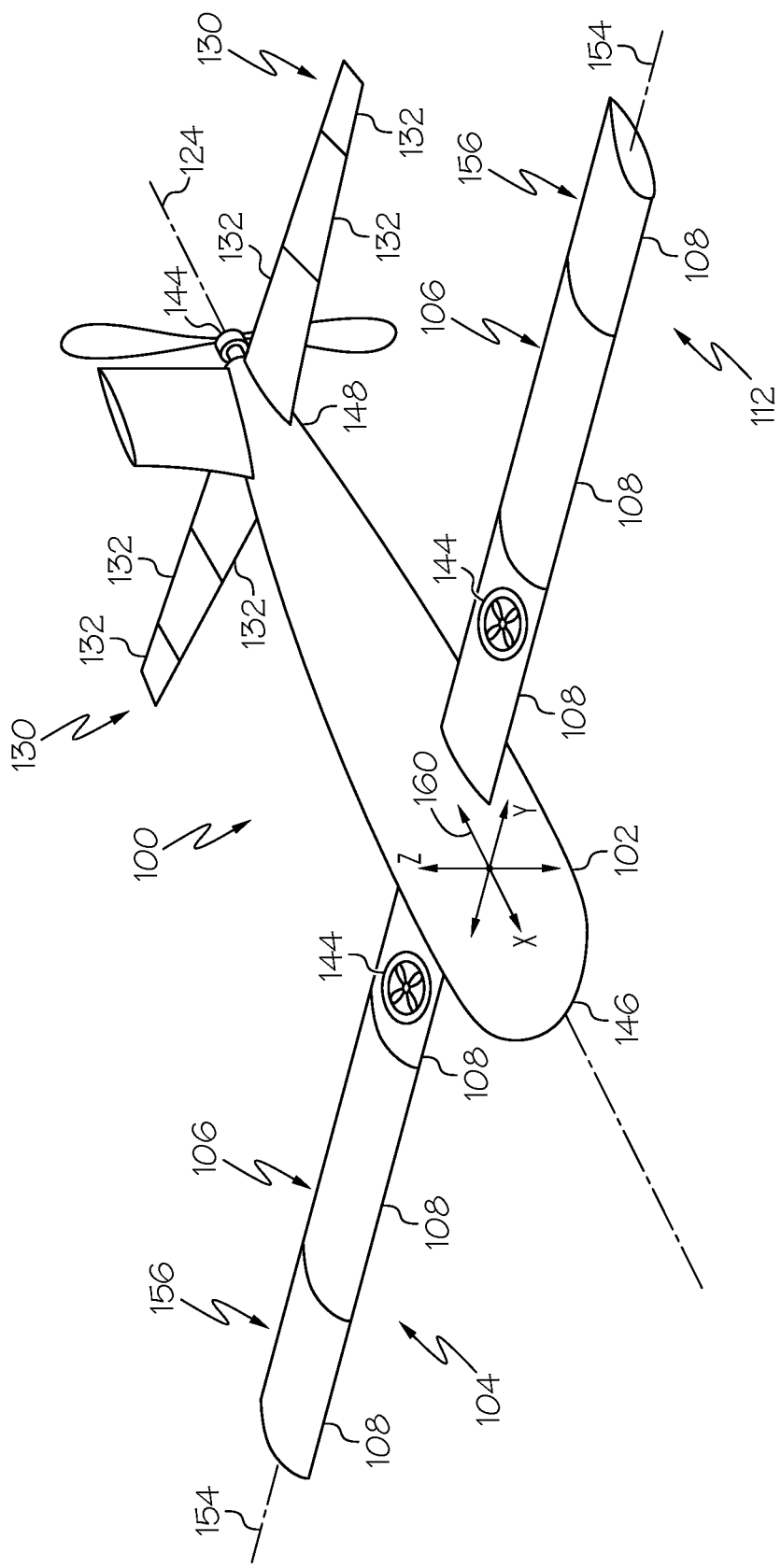
FIG. 20 is a schematic, perspective view of an example of the vehicle and the apparatus in a flight configuration.
Figure 21:
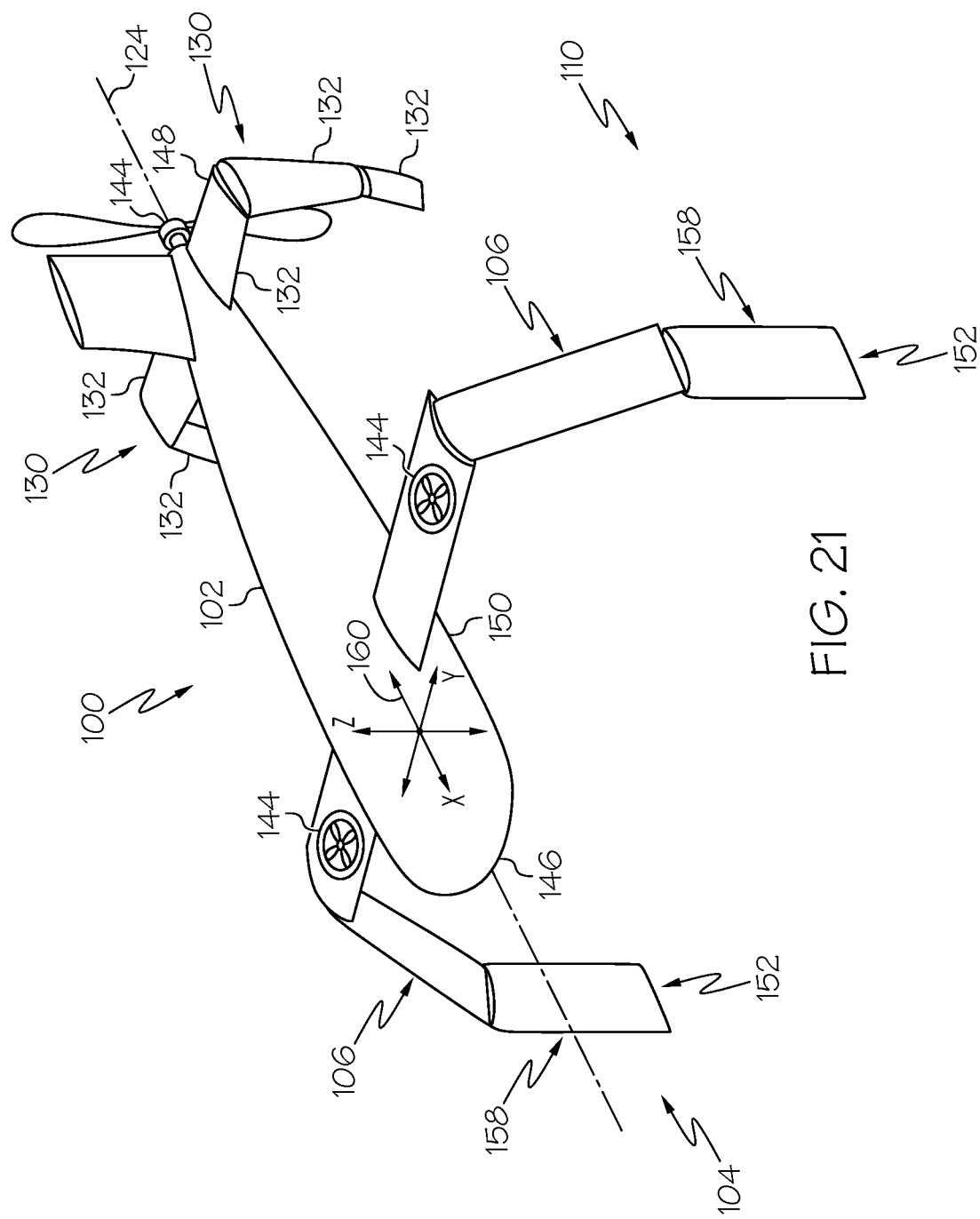
FIG. 21 is a schematic, perspective view of an example of the vehicle and the apparatus in a ground configuration.

Referring to FIGS. 20 and 21, in some examples in which the vehicle 100 includes the pair of articulate appendages 106 and the pair of second articulates appendages 130, a spanwise dimensions (i.e., the dimension of the articulated appendage from the inboard end 162 to the outboard end 152) of the pair of articulate appendages 106 and the pair of second articulates appendages 130 are different. In these examples, the pair of second articulated appendages 130 (the pair of articulated appendages that are located toward or proximate the aft end of the vehicle 100) may serve as horizontal stabilizers of the vehicle 100 when the second articulated appendages 130 are in the flight configuration 112.

Referring to FIGS. 22-28, the first pivot axis 118 and the second pivot axis 122 may have any one of various angular orientations relative to the one or more of the longitudinal axis 124 of the vehicle 100, the spanwise axis 154 of the articulate appendage 106 (in the flight configuration 112), the inboard spanwise axis 126 of the inboard airfoil segment 114, the intermediate spanwise axis 128 of the intermediate airfoil segment 116, and/or the outboard spanwise axis 164 of the outboard airfoil segment 120.

In some examples, to pivotally move the intermediate airfoil segment 116 relative to the inboard airfoil segment 114, the articulated appendage 106 includes a first pivot seam 176 that runs around a circumference of the articulated appendage 106 between the intermediate airfoil segment 116 and the inboard airfoil segment 114. The first pivot axis 118 runs through, or is parallel to, the first pivot seam 176. The first pivot axis 118 intersects a leading end 168 of the articulated appendage 106 at a first leading end point 172 and intersects a trailing end 170 of the articulated appendage 106 at a first trailing end point 174.

In some examples, to pivotally move the outboard airfoil segment 120 relative to the intermediate airfoil segment 116, the articulated appendage 106 includes a second pivot seam 178 that runs around a circumference of the articulated appendage 106 between the outboard airfoil segment 120 and the intermediate airfoil segment 116. The second pivot axis 122 runs through, or is parallel to, the second pivot seam 178. The second pivot axis 122 intersects the leading end 168 of the articulated appendage 106 at a second leading end point 180 and intersects the trailing end 170 of the articulated appendage 106 at a second trailing end point 182.

Figure 22:
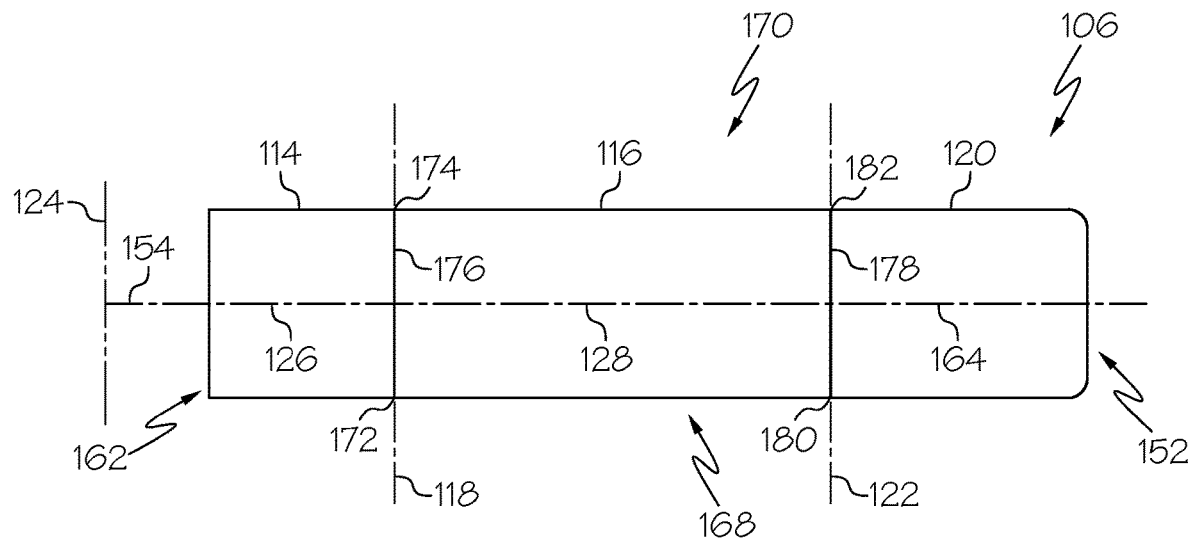
FIG. 22 is a schematic, perspective view of an example of the articulated appendage of the apparatus.
Figure 27:
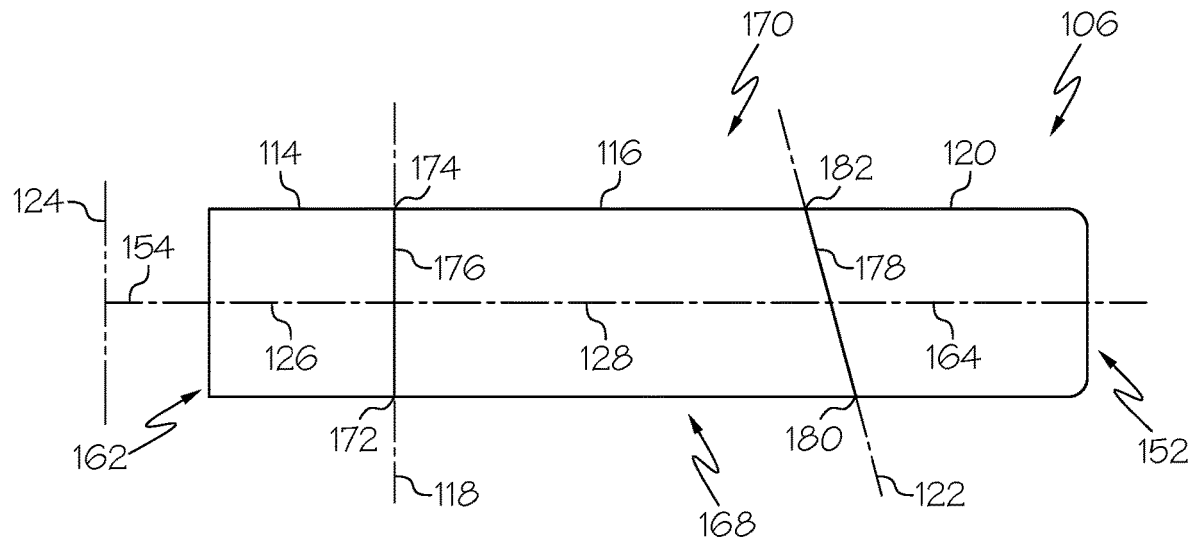
FIG. 27 is a schematic, elevation view of an example of the articulated appendage of the apparatus.
Figure 28:
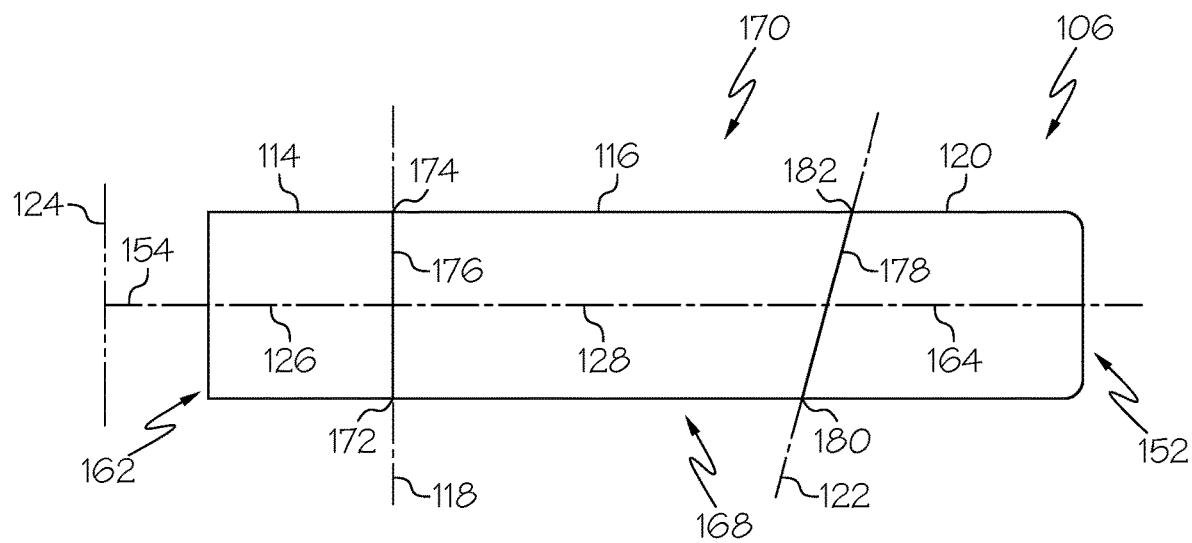
FIG. 28 is a schematic, elevation view of an example of the articulated appendage of the apparatus.

In some examples, as illustrated in FIGS. 22, 27, and 28, the first pivot axis 118 is approximately parallel to the longitudinal axis 124 of the fuselage 102 or the XZ-plane of the vehicle 100. In some examples, the first pivot axis 118 intersects and is approximately perpendicular to the inboard spanwise axis 126 and the intermediate spanwise axis 128.

Figure 23:
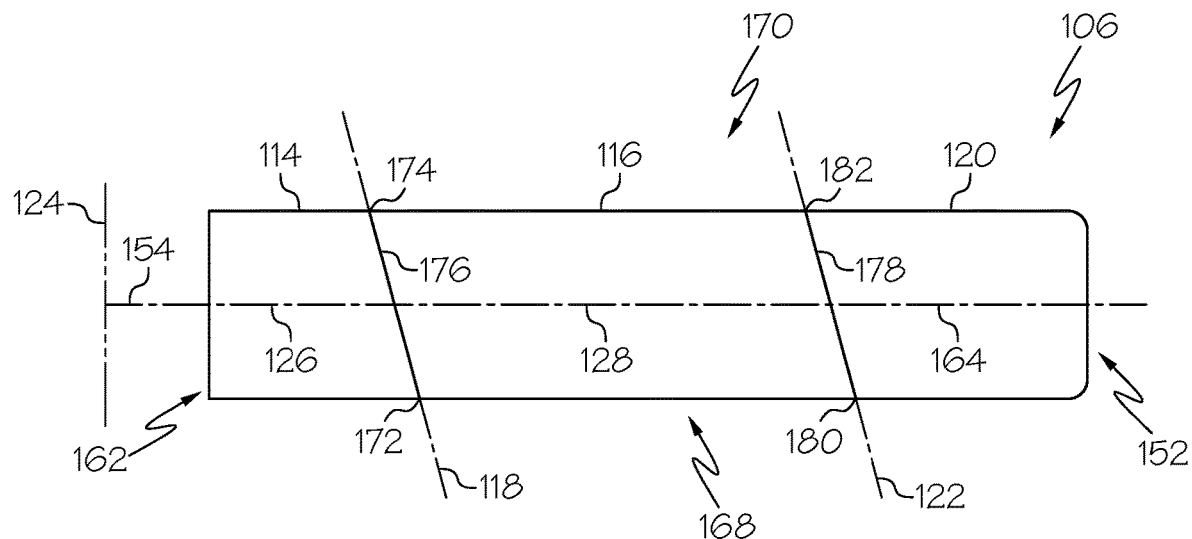
FIG. 23 is a schematic, perspective view of an example of the articulated appendage of the apparatus.
Figure 24:
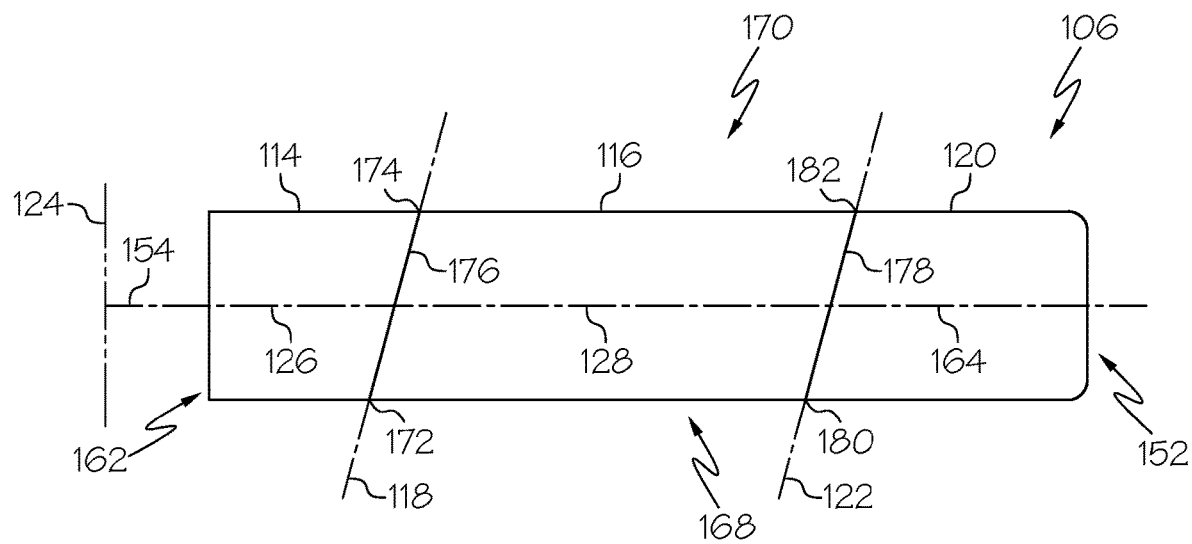
FIG. 24 is a schematic, exploded, perspective view of an example of the articulated appendage of the apparatus.
Figure 25:
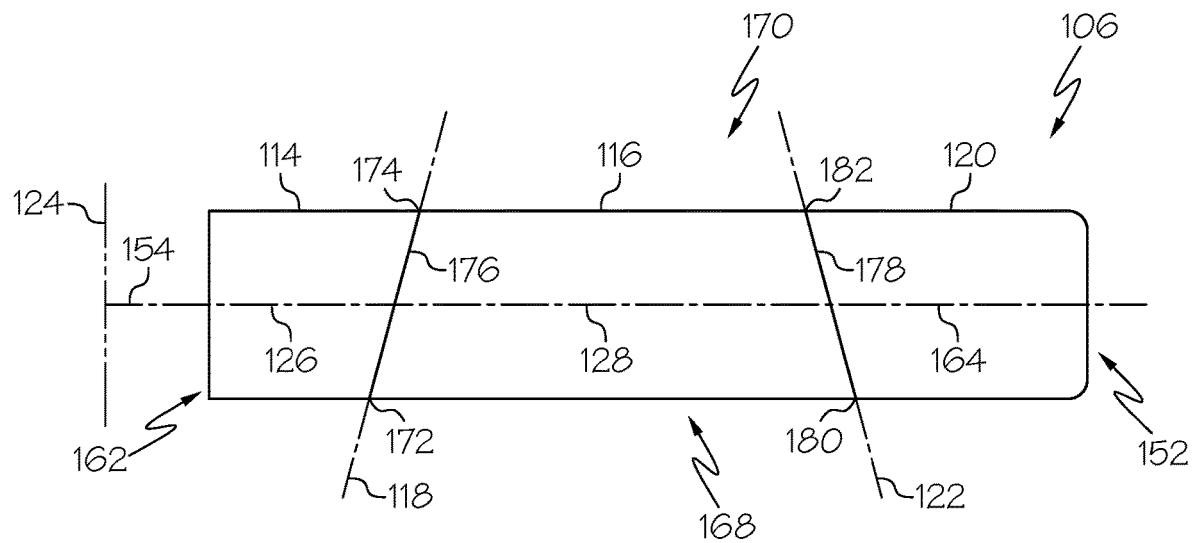
FIG. 25 is a schematic, perspective view of an example of the articulated appendage of the apparatus.
Figure 26:
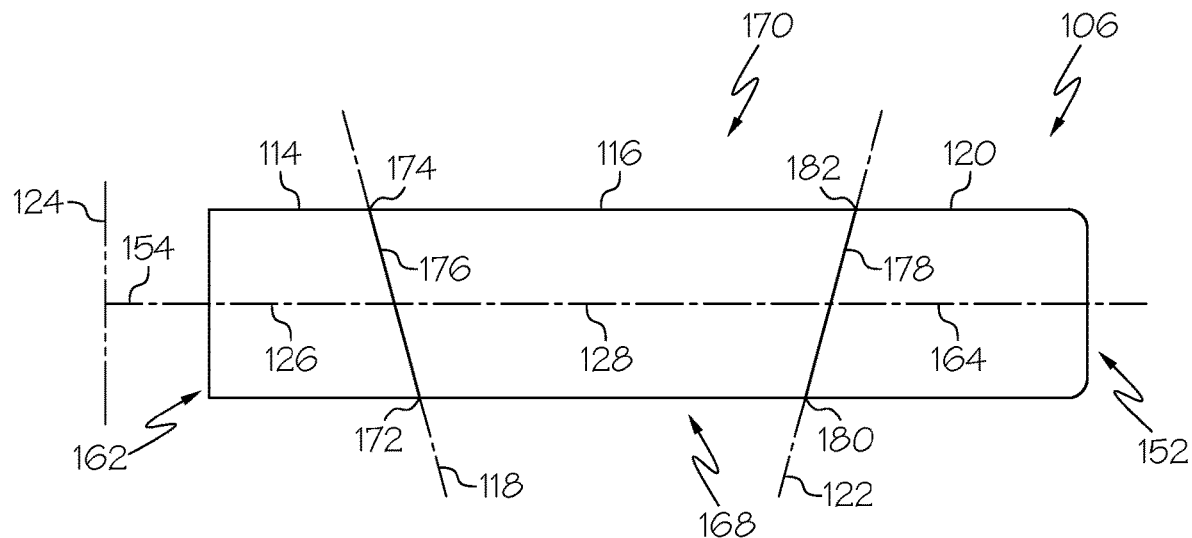
FIG. 26 is a schematic, perspective view of an example of the articulated appendage of the apparatus.
Figure 29:
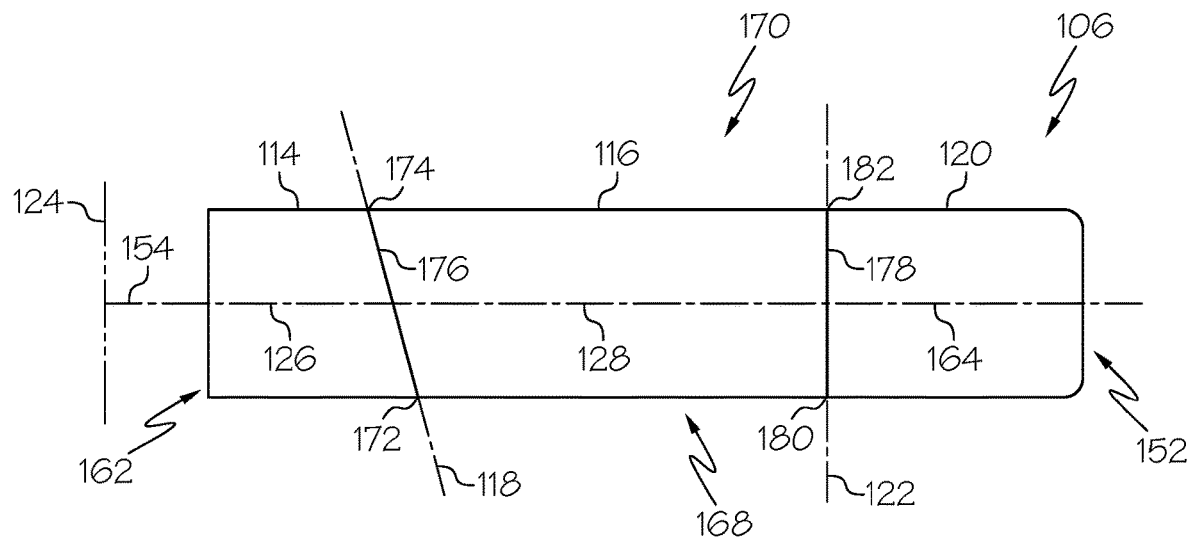
FIG. 29 is a schematic, elevation view of an example of the articulated appendage of the apparatus.

In some examples, as illustrated in FIGS. 23-26, 28, and 29, the first pivot axis 118 is oriented at a non-zero first pivot angle with respect to the longitudinal axis 124 of the fuselage 102 or the XZ-plane of the vehicle 100. In an example, the first pivot axis 118 is oblique to the longitudinal axis 124 of the fuselage 102 or the XZ-plane of the vehicle 100. In some examples, the first pivot axis 118 intersects and is oblique to the inboard spanwise axis 126 and the intermediate spanwise axis 128. In an example, as illustrated in FIGS. 23, 26, and 29, the first leading end point 172 is outboard of the first trailing end point 174. In an example, as illustrated in FIGS. 24, 25, and 30, the first leading end point 172 is inboard of the first trailing end point 174.

Figure 30:
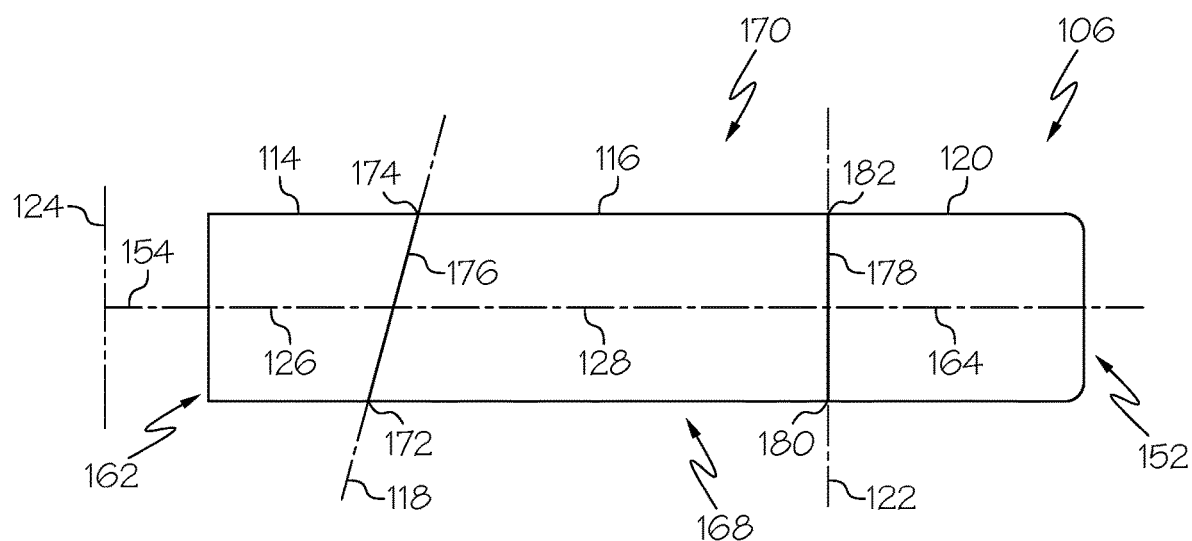
FIG. 30 is a schematic, elevation view of an example of the articulated appendage of the apparatus.

In some examples, as illustrated in FIGS. 22, 29, and 30, the second pivot axis 122 is approximately parallel to the longitudinal axis 124 of the fuselage 102 or the XZ-plane of the vehicle 100. In some examples, the second pivot axis 122 intersects and is approximately perpendicular to the intermediate spanwise axis 128 and the outboard spanwise axis 164.

In some examples, as illustrated in FIGS. 23-28, the second pivot axis 122 is oriented at a non-zero second pivot angle with respect to the longitudinal axis 124 of the fuselage 102 or the XZ-plane of the vehicle 100. In an example, the second pivot axis 122 is oblique to the longitudinal axis 124 of the fuselage 102 or the XZ-plane of the vehicle 100. In some examples, the second pivot axis 122 intersects and is oblique to the intermediate spanwise axis 128 and the outboard spanwise axis 164. In an example, as illustrated in FIGS. 23, 25, and 27, the second leading end point 180 is outboard of the second trailing end point 182. In an example, as illustrated in FIGS. 24, 26, and 28, the second leading end point 180 is inboard of the second trailing end point 182.

In some examples, as illustrated in FIGS. 22-24, the first pivot axis 118 and the second pivot axis 122 are parallel to each another. In an example, the first pivot angle of the first pivot axis 118 and the second pivot angle of the second pivot axis 122 are the same. In some examples, as illustrated in FIGS. 25-30, the first pivot axis 118 and the second pivot axis 122 are oblique to each another. In an example, the first pivot angle of the first pivot axis 118 and the second pivot angle of the second pivot axis 122 are different same.

In some examples, the first pivot axis 118 and/or the second pivot axis 122 being oriented at a non-zero pivot angle enable the intermediate airfoil segment 116 and/or the outboard airfoil segment 120 to serve as control surfaces, for example, to trim the airflow crossing the articulated appendage 106 during flight when pivoted. Accordingly, with articulated appendages 106 in the flight configuration 112, pivotally moving at least one of the plurality of airfoil segments 108 of each one of the pair of articulated appendages 106 may control a pitch and/or a roll, generally referred to herein as an attitude, of the vehicle 100 during flight of the vehicle 100.

Referring to FIG. 30, the articulated appendage 106 and/or each one of the airfoil segments 108 may have any one of various structural configurations. Generally, the articulated appendage 106 and each one of the airfoil segments 108 are constructed to react to any forces and/or loads applied to the articulated appendage 106 during take-off and landing (i.e., when in the ground configuration 110) and during flight (i.e., when in the flight configuration).

The articulated appendage 106 is formed of, or constructed from, various components including, but not limited to, the plurality of spanwise structural components 138, the plurality of chordwise structural components 140, and a plurality of skin panels 142. For the purpose of this disclosure, the phrase "structural component," with reference to any one of the plurality of structural components of the articulated appendage 106 and/or each one of the airfoil segments 108, refers to a load-bearing element that is configured to carry a load or react to stresses and forces applied to the articulated appendage 106.

In an example, the articulated appendage 106 has the spanwise dimension (i.e., the dimension of the articulated appendage from the inboard end 162 to the outboard end 152) and a chordwise dimension (i.e., the dimension of the articulated appendage from the leading end 168 to the trailing end 170). The spanwise structural components 138 extend along the spanwise dimension. The chordwise structural components 140 are coupled to the spanwise structural components 138 and extend along the chordwise dimension. The skin panels 142 are coupled to the chordwise structural components 140.

The spanwise structural components 138 are configured to carry flight loads when the vehicle is in flight and bear the weight of the vehicle 100 when the vehicle 100 in on the ground. In an example, the spanwise structural components 138 include, or take the form of, spars of the articulated appendage 106. The chordwise structural components 140 are configured to define the airfoil shape of the articulated appendage 106 or each one of the airfoil segments 108 and share the flight loads when the vehicle is in flight. In an example, the chordwise structural components 140 includes, or take the form of, ribs of the articulated appendage 106. In some examples, the skin panels 142 have a stressed skin construction configured to share the loads applied to the articulated appendage 106 when in the flight configured 112 and/or the ground configuration.

In an example, the spanwise structural components 138 includes at least one inboard spanwise structural component 188, the chordwise structural components 140 include at least one inboard chordwise structural component 190, and the skin panels 142 includes a pair of (e.g., an upper and a lower) inboard skin panels 200 that form the inboard airfoil segment 114. In an example, the spanwise structural components 138 includes at least one intermediate spanwise structural component 192, the chordwise structural components 140 include at least one intermediate chordwise structural component 194, and the skin panels 142 includes a pair of (e.g., an upper and a lower) intermediate skin panels 202 that form the intermediate airfoil segment 116. In an example, the spanwise structural components 138 includes at least one outboard spanwise structural component 196, the chordwise structural components 140 include at least one outboard chordwise structural component 198, and the skin panels 142 includes a pair of (e.g., an upper and a lower) outboard skin panels 204 that form the outboard airfoil segment 120.

Figure 31:
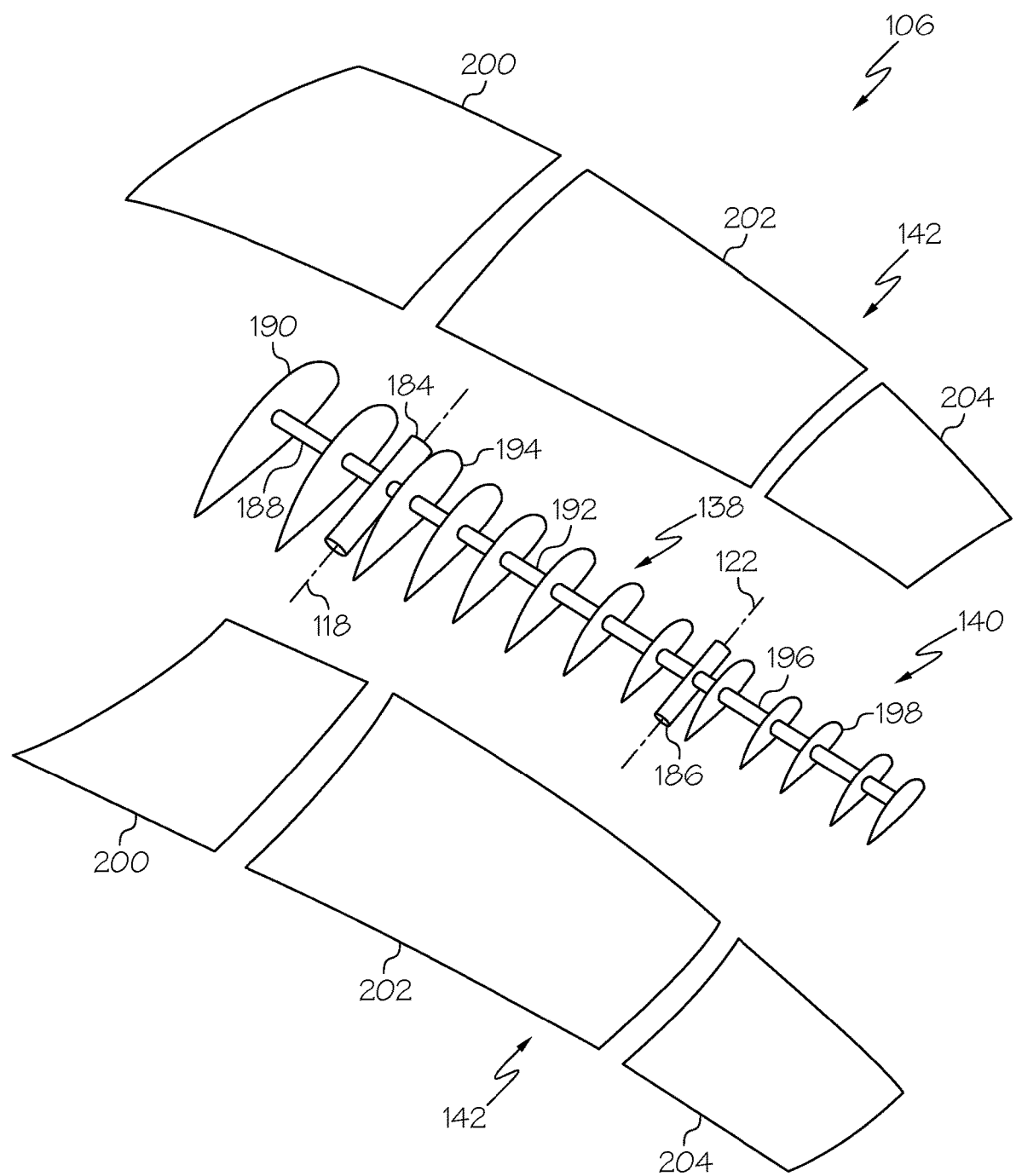
FIG. 31 is a schematic, exploded, perspective view of an example of the articulated appendage of the apparatus.
Figure 32:
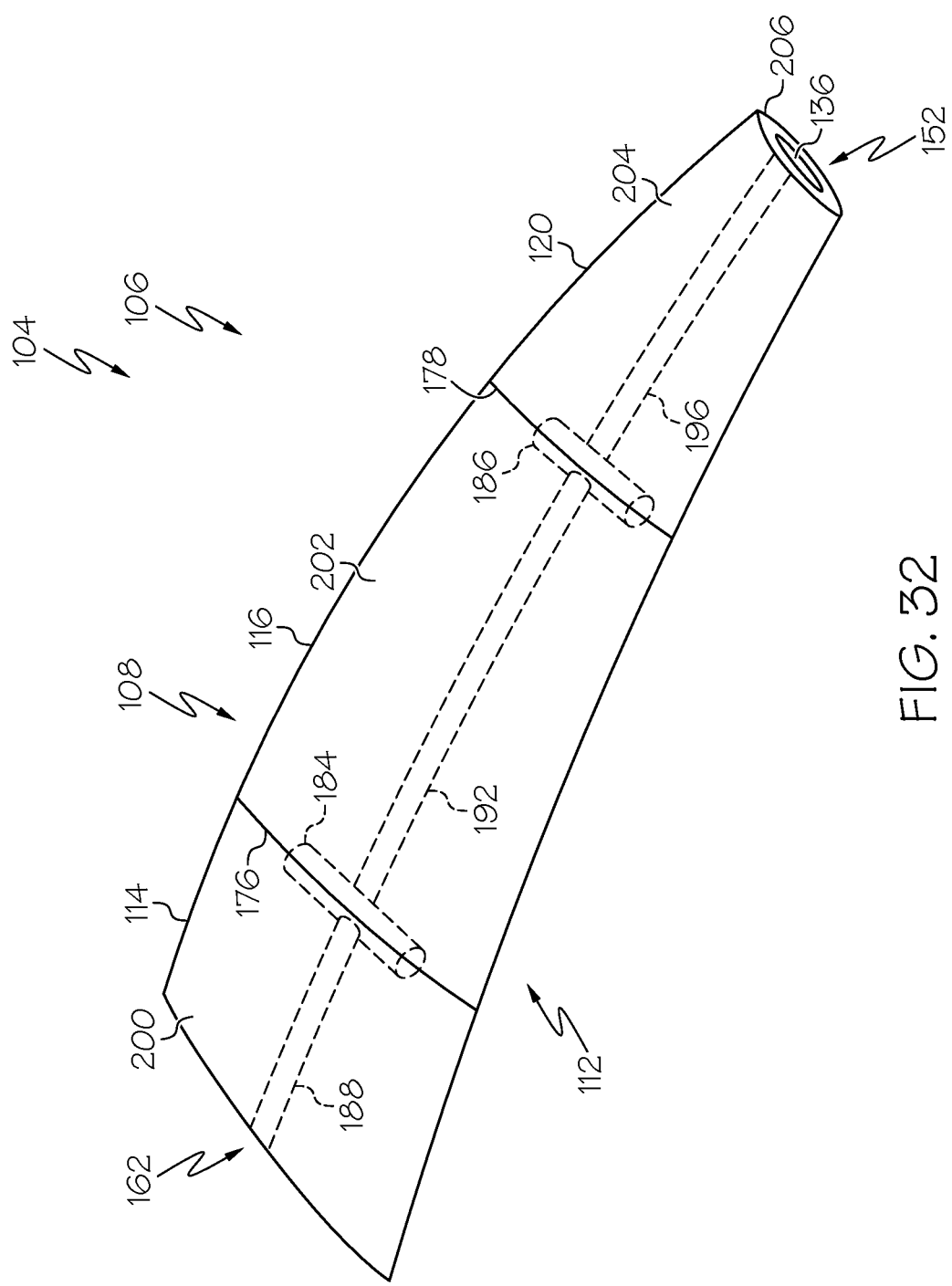
FIG. 32 is a schematic, perspective view of an example of the articulated appendage of the apparatus.
Figure 33:
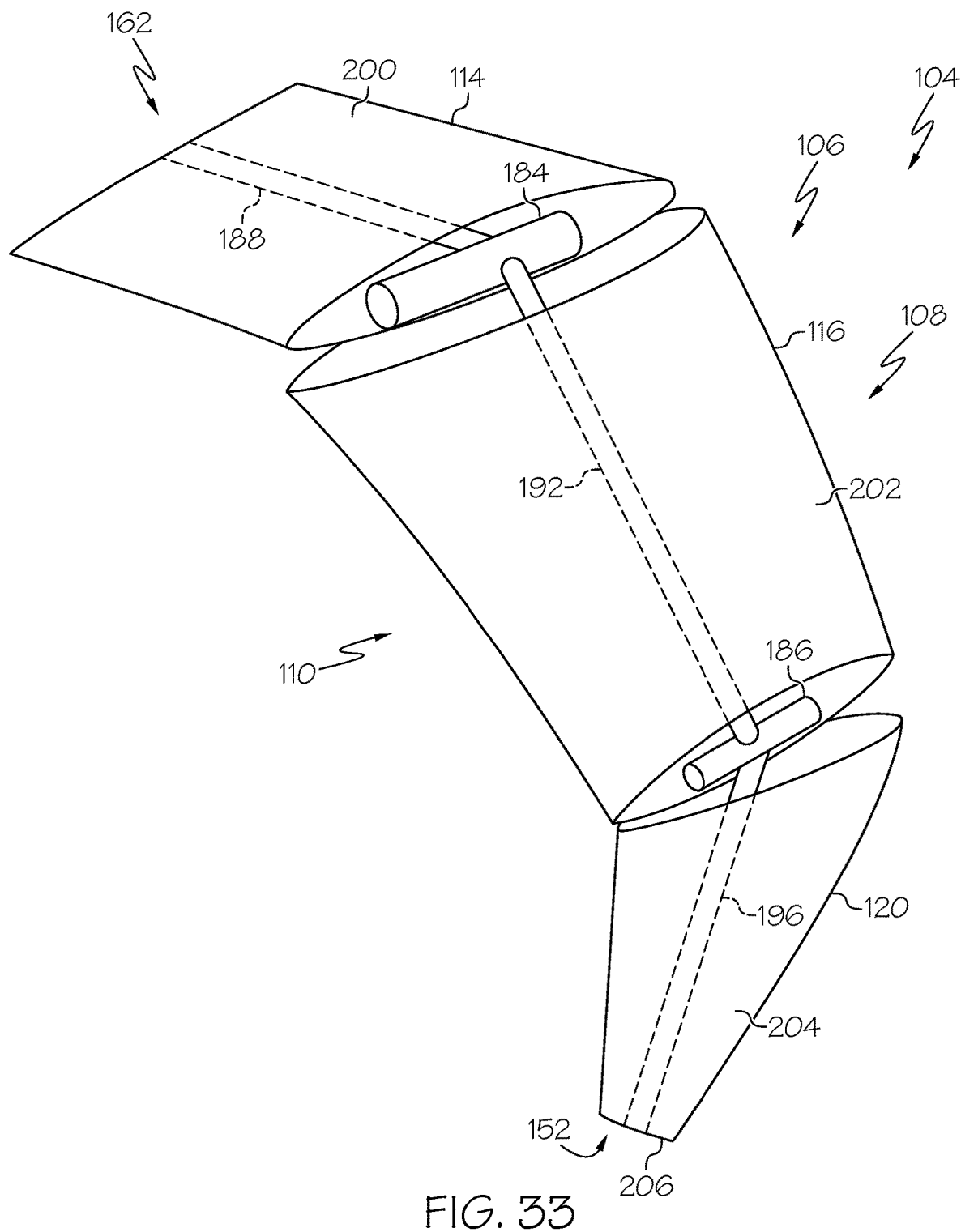
FIG. 33 is a schematic, perspective view of an example of the articulated appendage of the apparatus.

Referring to FIGS. 31-33, in some examples, the articulated appendage 106 includes a first pivot joint 184, or inboard pivot joint. In an example, the first pivot joint 184 pivotally couples the inboard spanwise structural component 188 and the intermediate spanwise structural component 192 together to enable pivotal motion of the intermediate airfoil segment 116 relative to the inboard airfoil segment 114. In an example, the first pivot joint 184 defines the first pivot axis 118.

In some examples, the articulated appendage 106 includes a second pivot joint 186, or outboard pivot joint. In an example, the second pivot joint 186 pivotally couples the intermediate spanwise structural component 192 and the outboard spanwise structural component 196 together to enable pivotal motion of the outboard airfoil segment 120 relative to the intermediate airfoil segment 116. In an example, the second pivot joint 186 defines the second pivot axis 122.

In some other examples, the articulated appendage 106 and/or each one of the airfoil segments 108 may have structural configurations other than the illustrated examples. In an example, the articulated appendage 106 and/or each one of the airfoil segments 108 includes a truss-like internal structural frame and a plurality of aerodynamic fairings that are coupled to the internal structural frame to define the airfoil shape of the articulated appendage 106 and/or each one of the airfoil segments 108. In this example, the internal structural frame includes an inboard frame section, an intermediate frame section that is pivotally coupled with the inboard frame section by the first pivot joint 184, and an outboard frame section that is pivotally coupled with the intermediate frame section by the second pivot joint 186.

In some examples, the inboard spanwise structural component 188 runs parallel to the inboard spanwise axis 126. In some examples, the intermediate spanwise structural component 192 runs parallel to the intermediate spanwise axis 128. In some examples, outboard spanwise structural component 196 runs parallel to the outboard spanwise axis 164.

In some examples, the first pivot seam 176 is formed between the inboard skin panels 200 and the intermediate skin panels 202. The second pivot seam 178 is formed between the intermediate skin panels 202 and the outboard skin panels 204. The first pivot seam 176 is configured to accommodate the first pivot joint 184. The second pivot seam 178 is configured to accommodate the second pivot joint 186.

Referring to FIGS. 32 and 33, in some examples, the articulated appendage 106 includes a foot 206 located at, or coupled to, the outboard end 152 of the articulated appendage 106. With the articulated appendage 106 in the ground configuration 110, the foot 206 is configured to contact the takeoff and landing surface during takeoff and/or landing. In an example, the foot 206 is coupled to or is integral to a free end of the outboard airfoil segment 120, opposite the second pivot joint 186. The foot 206 may have any one of various configurations or profile shapes designed to maximize contact with the takeoff and landing surface. In an example, the foot 206 is angled. In an example, the foot 206 is rounded or has a curved profile shape when viewed in the chordwise direction.

Figure 34:
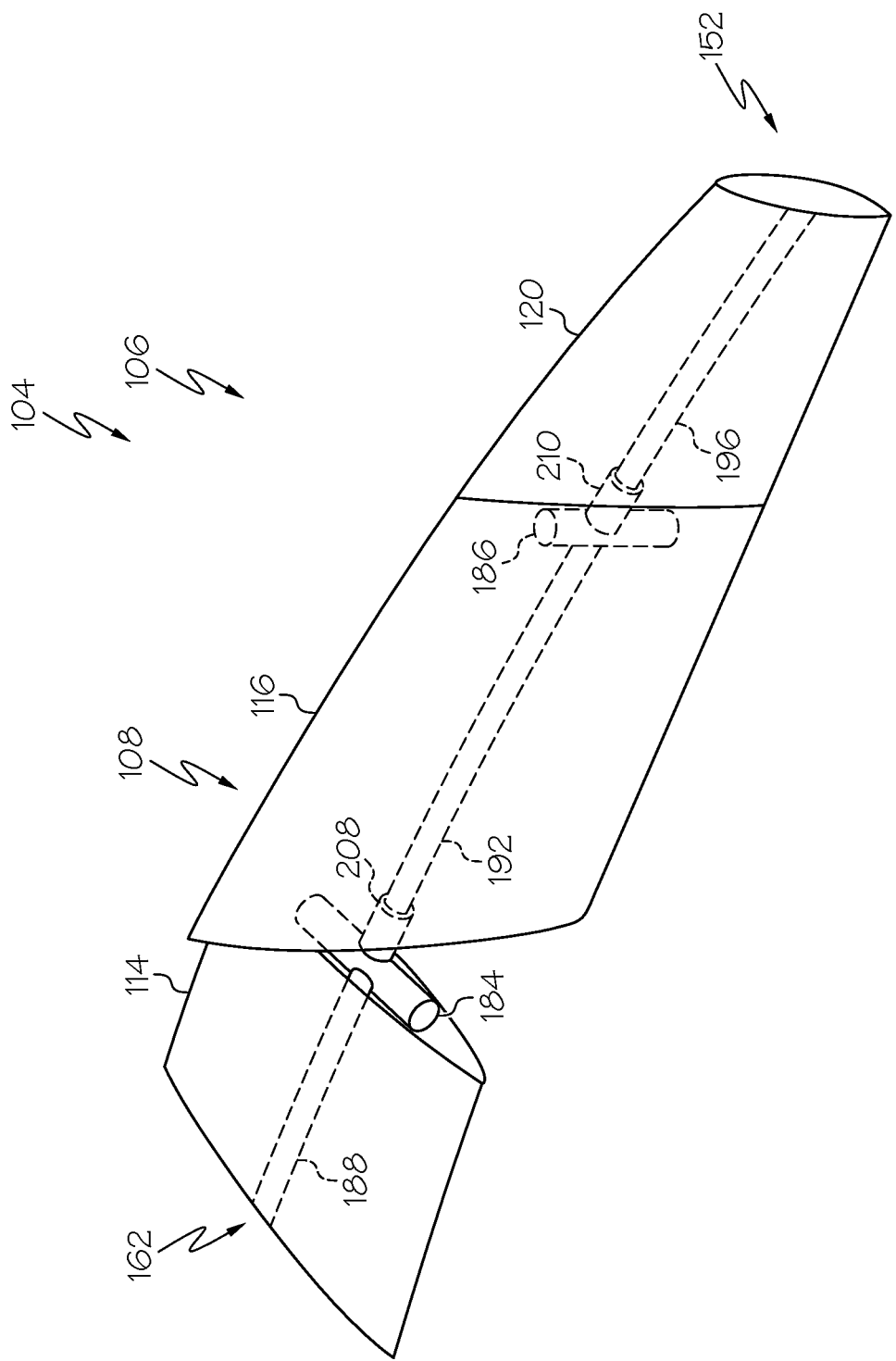
FIG. 34 is a schematic, perspective view of an example of the articulated appendage of the apparatus.

Referring to FIG. 34, in some examples, the intermediate airfoil segment 116 is rotationally movable about the intermediate spanwise axis 128 relative to the inboard airfoil segment 114. Rotational movement of the intermediate airfoil segment 116 relative to the inboard airfoil segment 114 modifies the aerodynamic characteristics of the articulated appendage 106 when in the flight configuration 112. In an example, rotational movement of the intermediate airfoil segment 116 relative to the inboard airfoil segment 114 adjusts the angle of attack of a portion of the articulated appendage 106, such as the intermediate airfoil segment 116 and the outboard airfoil segment 120.

Figure 35:
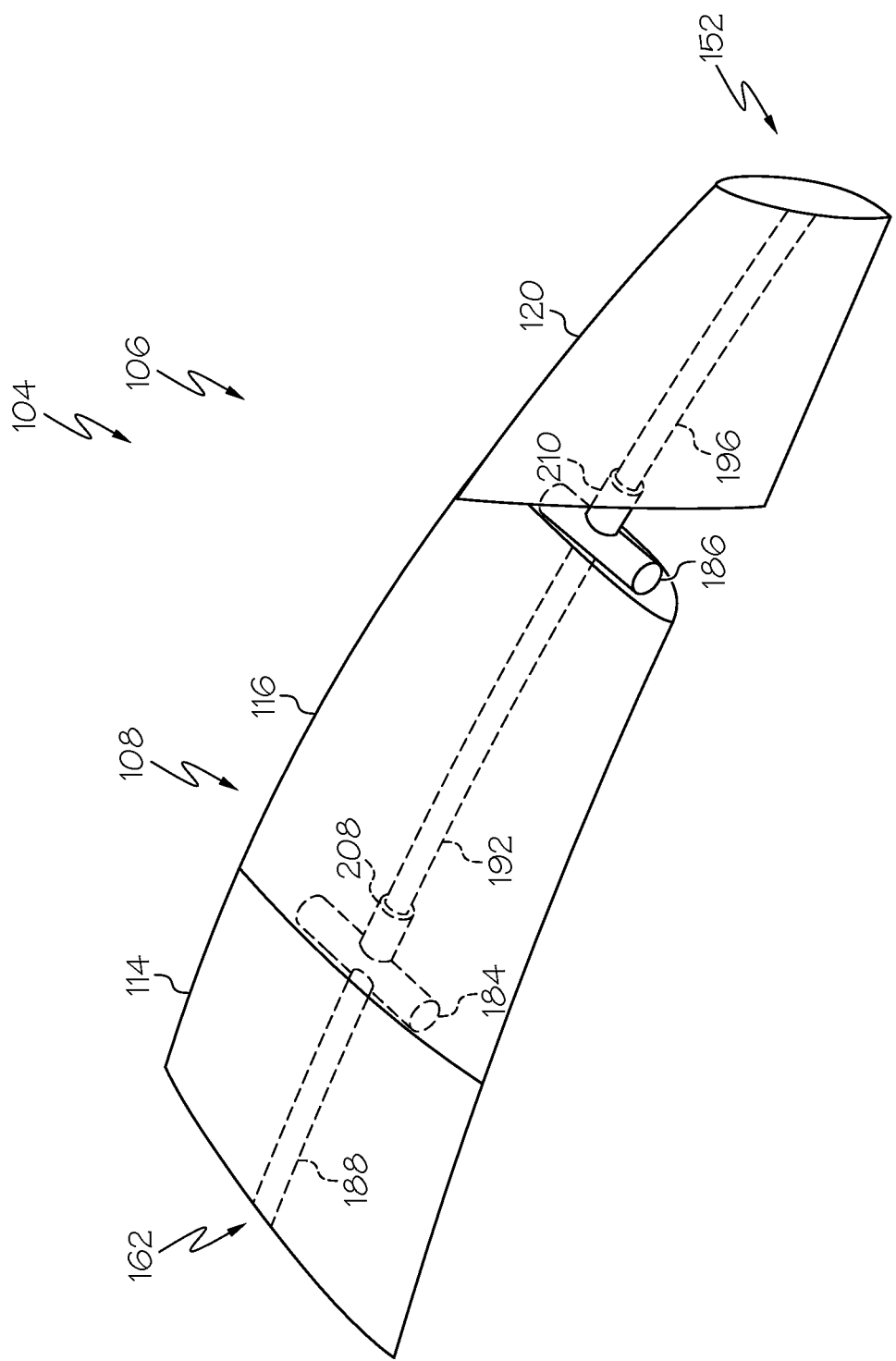
FIG. 35 is a schematic, perspective view of an example of the articulated appendage of the apparatus.

Referring to FIG. 35, in some examples, the outboard airfoil segment 120 is rotationally movable about the outboard spanwise axis 164 relative to the intermediate airfoil segment 116. Rotational movement of the outboard airfoil segment 120 relative to the intermediate airfoil segment 116 modifies the aerodynamic characteristics of the articulated appendage 106 when in the flight configuration 112. In an example, rotational movement of outboard airfoil segment 120 relative to the intermediate airfoil segment 116 adjusts the angle of attack of a portion of the articulated appendage 106, such as the outboard airfoil segment 120.

In some examples, rotational movement of the intermediate airfoil segment 116 relative to the inboard airfoil segment 114 and/or rotational movement of the outboard airfoil segment 120 relative to the intermediate airfoil segment 116 enable the intermediate airfoil segment 116 and/or the outboard airfoil segment 120 to serve as control surfaces, for example, to trim the airflow crossing the articulated appendage 106 during flight when rotated. Accordingly, with articulated appendages 106 in the flight configuration 112, rotationally moving at least one of the plurality of airfoil segments 108 of each one of the pair of articulated appendages 106 may control the pitch and/or the roll (the attitude) of the vehicle 100 during flight of the vehicle 100

Referring to FIGS. 34 and 35, in some examples, the articulated appendage 106 includes a first rotational joint 208. In an example, the first rotational joint 208 rotationally couples the inboard spanwise structural component 188 and the intermediate spanwise structural component 192 together to enable rotational motion of the intermediate airfoil segment 116 relative to the inboard airfoil segment 114. In an example, the first rotational joint 208 defines a first rotation axis that is coincident with or parallel to the intermediate spanwise axis 128.

In some examples, the articulated appendage 106 includes a second rotational joint 210. In an example, the second rotational joint 210 rotationally couples the outboard spanwise structural component 196 and the intermediate spanwise structural component 192 together to enable rotational motion of the outboard airfoil segment 120 relative to the intermediate airfoil segment 116. In an example, the second rotational joint 210 defines a second rotation axis that is coincident with or parallel to the outboard spanwise axis 164.

Referring to FIG. 1, in some examples, the apparatus 104 includes at least one pivot actuator 212. The pivot actuator 212 is operatively coupled with the first pivot joint 184 and the second pivot joint 186. The pivot actuator 212 is configured to selectively adjust the position and/or orientation of the articulated appendage 106 by at least one of selectively pivotally moving the intermediate airfoil segment 116 relative to the inboard airfoil segment 114 and selectively pivotally moving the outboard airfoil segment 120 relative to the intermediate airfoil segment 116.

The pivot actuator 212 may be any suitable type of controllable actuation mechanism. In an example, the pivot actuator 212 is a linear actuator. In an example, the pivot actuator 212 is a rotary actuator. In some examples, the pivot actuator 212 includes one of a hydraulic actuator, a pneumatic actuator, a mechanical or electro-mechanical actuator, or other suitable type of actuation mechanism configured to control pivotal movement of the first pivot joint 184 and/or the second pivot joint 186. In some examples, the pivot actuator 212 includes a stepper motor, a servomotor, and other suitable types of selectively controllable motors.

In some examples, the apparatus 104 includes one pivot actuator 212 that is configured to operate both the first pivot joint 184 and the second pivot joint 186. In some examples, the apparatus 104 includes a plurality of pivot actuators 212, each one being configured to operate a corresponding one of the first pivot joint 184 and the second pivot joint 186.

Referring to FIG. 1, in some examples, the apparatus 104 includes at least one rotation actuator 214. The rotation actuator 214 is operatively coupled with the first rotational joint 208 and the second rotational joint 210. The rotation actuator 214 is configured to selectively adjust the position and/or orientation of the articulated appendage 106 by at least one of selectively rotationally moving the intermediate airfoil segment 116 relative to the inboard airfoil segment 114 and selectively rotationally moving the outboard airfoil segment 120 relative to the intermediate airfoil segment 116.

The rotational actuator 214 may be any suitable type of controllable actuation mechanism. In an example, the rotation actuator 214 is a rotary actuator. In some examples, the rotation actuator 214 includes one of a hydraulic actuator, a pneumatic actuator, a mechanical or electro-mechanical actuator, or other suitable type of actuation mechanism configured to control rotational movement of the first rotational joint 208 and/or the second rotational joint 210. In some examples, the rotation actuator 214 includes a stepper motor, a servomotor, and other suitable types of selectively controllable motors.

In some examples, the apparatus 104 includes one rotation actuator 214 that is configured to operate both the first rotational joint 208 and the second rotational joint 210. In some examples, the apparatus 104 includes a plurality of rotation actuators 214, each one being configured to operate a corresponding one of the first rotational joint 208 and the second rotational joint 210.

Referring to FIG. 1, in some examples, the apparatus 104 includes at least one pivotal-power transmitting component 220. The pivotal-power transmitting component 220 is operatively coupled with the pivot actuator 212 and the first pivot joint 184 and/or the second pivot joint 186. The pivotal-power transmitting component 220 is configured to transmit power from the pivot actuator 212 to a corresponding one of the first pivot joint 184 and/or the second pivot joint 186 to selectively pivotally move the intermediate airfoil segment 116 relative to the inboard airfoil segment 114 and/or selectively pivotally move the outboard airfoil segment 120 relative to the intermediate airfoil segment 116.

The pivotal-power transmitting component 220 may be any suitable type of power transmitting mechanism. In some examples, the pivotal-power transmitting component 220 is one of a gear train, a chain, a belt, or the like. In some examples, the apparatus 104 includes one pivotal-power transmitting component 220 that is configured to operate both the first pivot joint 184 and the second pivot joint 186. In some examples, the apparatus 104 includes a plurality of pivotal-power transmitting components 220, each one being configured to operate a corresponding one of the first pivot joint 184 and the second pivot joint 186.

Referring to FIG. 1, in some examples, the apparatus 104 includes at least one rotational-power transmitting component 222. The rotational-power transmitting component 222 is operatively coupled with the rotation actuator 214 and the first rotational joint 208 and/or the second rotational joint 210. The rotational-power transmitting component 222 is configured to transmit power from the rotation actuator 214 to a corresponding one of the first rotational joint 208 and/or the second rotational joint 210 to selectively rotationally move the intermediate airfoil segment 116 relative to the inboard airfoil segment 114 and/or selectively rotationally move the outboard airfoil segment 120 relative to the intermediate airfoil segment 116.

The rotational-power transmitting component 222 may be any suitable type of power transmitting mechanism. In some examples, the rotational-power transmitting component 222 is one of a gear train, a chain, a belt, or the like. In some examples, the apparatus 104 includes one rotational-power transmitting component 222 that is configured to operate both the first rotational joint 208 and the second rotational joint 210. In some examples, the apparatus 104 includes a plurality of rotational-power transmitting component 222, each one being configured to operate a corresponding one of the first rotational joint 208 and the second rotational joint 210.

Referring to FIG. 1, in some examples, the apparatus 104 includes at least one pivot lock 216. The pivot lock 216 is operatively coupled with the first pivot joint 184 and/or the second pivot joint 186. The pivot lock 216 is operable to selectively lock the articulated appendage 106 in the flight configuration 112 during flight of the vehicle 100 and to selectively lock the articulated appendage 106 in the ground configuration 110 during takeoff and/or landing of the vehicle 100. In some examples, the pivot lock 216 is configured to lock a corresponding one of the first pivot joint 184 and/or the second pivot joint 186 at a selectively pivoted position to lock the intermediate airfoil segment 116 relative to the inboard airfoil segment 114 and/or lock the outboard airfoil segment 120 relative to the intermediate airfoil segment 116.

The pivot lock 216 may be any suitable type of locking mechanism. The pivot-locking capability of the pivot lock 216 may be achieved in a variety of way by a variety of selectively controlled locking mechanisms. In an example, the pivot actuator 212 and/or the pivot-power transmitting component 220 utilized to operate the pivoting action may be non-backdriveable. For the purpose of this disclosure, the term "non-backdriveable" refers to a transmission that, due to the fundamental orientation of the mechanism, can only be driven in one direction. Examples of such non-backdriveable mechanisms include worm gears and lead screws. A strong lead screw may be nearly as stiff as a standard structural element (e.g., a steel rod). In an example, the pivot actuator 212 and/or the pivot-power transmitting component 220 utilized to operate the pivoting action may be backdriveable. Examples of such backdrivable mechanisms include hydraulic piston or pneumatic piston that closes all fluid (e.g., hydraulic fluid or air) ports when in a desired pivoted position. Backdrivable mechanisms may be beneficial in performance of control algorithms used to selectively move the articulated appendages 106 during takeoff and landing. A strong hydraulic piston may be nearly as stiff as a standard structural element (e.g., a steel rod). In an example, pivot-locking capability of the pivot lock 216 may be achieved by application of a type of brake or lock to the corresponding pivot joint (e.g., first pivot joint 184 and/or second pivot joint 186), which has a separate actuator that opens/closes. In an example, the pivot lock 216 includes a locking member and a locking actuator operatively coupled to the locking member to move the locking member between a locked and an unlock position. With the locking member in the locked configuration or position, it can withstand very large loads perpendicular to the action of the locking member. In an example, the pivot lock 216 that utilizes the selectively movable locking member and locking actuator may be utilized with the pivot actuator 212 and/or the pivot-power transmitting component 220 that are backdriveable.

In some examples, the apparatus 104 includes one pivot lock 216 that is configured to lock both the first pivot joint 184 and the second pivot joint 186. In some examples, the apparatus 104 includes a plurality of pivot locks 216, each one being configured to lock a corresponding one of the first pivot joint 184 and the second pivot joint 186.

Referring to FIG. 1, in some examples, the apparatus 104 includes at least one rotation lock 218. The rotation lock 218 is operatively coupled with the first rotational joint 208 and/or the second rotational joint 210. The rotation lock 218 is operable to selectively lock the articulated appendage 106 in the flight configuration 112 during flight of the vehicle 100. In some examples, the rotation lock 218 is configured to lock a corresponding one of the first rotational joint 208 and/or the second rotational joint 210 at a selectively rotated position to lock the intermediate airfoil segment 116 relative to the inboard airfoil segment 114 and/or lock the outboard airfoil segment 120 relative to the intermediate airfoil segment 116.

The rotation lock 218 may be any suitable type of locking mechanism. The rotational-locking capability of the rotation lock 218 may be achieved in a variety of way by a variety of selectively controlled locking mechanisms. In an example, the rotation actuator 214 and/or the rotational-power transmitting component 222 utilized to operate the rotational action may be non-backdriveable. In an example, the rotation actuator 214 and/or the rotational-power transmitting component 222 utilized to operate the rotational action may be backdriveable. In an example, rotational-locking capability of the rotation lock 218 may be achieved by application of a type of brake or lock (e.g., a locking member) to the corresponding rotational joint (e.g., first rotational joint 208 and/or second rotational joint 210), which has a separate actuator that opens/closes.

In some examples, the apparatus 104 includes one rotation lock 218 that is configured to lock both the first rotational joint 208 and the second rotational joint 210. In some examples, the apparatus 104 includes a plurality of rotation lock 218, each one being configured to lock a corresponding one of the first rotational joint 208 and the second rotational joint 210.

Referring to FIG. 1, in some example, the apparatus 104 also includes a controller 134. The controller 134 is configured to actuate movement of the articulated appendage 106. The controller 134 is operable to control selective actuation of the articulated appendage 106 to move the articulated appendage 106 between the flight configuration 112 and the ground configuration 110. In some examples, the controller 134 is operable to control selective actuation of each one of the articulated appendages 106 of the vehicle independently. In other words, the controller 134 is configured to selectively and independently control the position and/or orientation of each one of a corresponding pair of articulated appendages 106 during flight of the vehicle 100 and during takeoff and landing of the vehicle 100.

In some examples, the controller 134 is operatively, or communicatively (e.g., electrically), coupled with the pivot actuator 212. The controller 134 is operable to selectively control actuation of the pivot actuator 212 to selectively control the pivotal movement of the intermediate airfoil segment 116 relative to the inboard airfoil segment 114 and/or selectively control the pivotal movement of the outboard airfoil segment 120 relative to the intermediate airfoil segment 116.

In some examples, the controller 134 is operatively, or communicatively, coupled with the rotation actuator 214. The controller 134 is operable to selectively control actuation of the rotation actuator 214 to selectively control the rotational movement of the intermediate airfoil segment 116 relative to the inboard airfoil segment 114 and/or selectively control the rotational movement of the outboard airfoil segment 120 relative to the intermediate airfoil segment 116.

The controller 134 may be any suitable control apparatus or system that is capable of generating and communicating command signals to achieve a desired result from a controlled device (e.g., the pivot actuator 212 and/or the rotational actuator 214). In an example, the controller 134 includes a microprocessor. In an example, the controller 134 is implemented within a computer system (e.g., one or more computers). In some examples, the controller 134 is implemented using hardware, software, or a combination of hardware and software. When software is employed, operations to be performed may be implemented in the form of program code or instructions stored on a computer readable storage medium (e.g., a non-transitory computer readable storage medium) configured to be executed by a processor. When hardware is employed, the hardware may include circuits that operate to perform the operations.

In some examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array (FPGA), and other suitable hardware devices.

Referring to FIG. 1, in some examples, the apparatus 104 includes at least one sensor 136. The sensor 136 is communicatively coupled with the controller 134. With the articulated appendage 106 in the ground configuration 110, the sensor 136 is operable to detect the takeoff and landing surface during takeoff and/or landing of the vehicle 100. Based on the information provided by the sensor 136, the controller 134 is configured to determine when to move and how much to move the articulated appendage 106 or each one of the airfoil segments 108.

In some examples, the sensor 136 is located proximate to (e.g., at or near) the outboard end 152 of the articulated appendage 106. In some examples, as illustrated in FIG. 32, the sensor 136 is coupled to the foot 206 of the articulate appendage 106.

The sensor 136 may be any suitable type of sensing device that is capable to determining the presence of the takeoff and landing surface, relative motion of the takeoff and landing surface relative to the vehicle 100, and/or the slope of the takeoff and landing surface. In an example, the sensor 136 is an optical sensor operable to detect or read a configuration of a surface. In an example, the sensor 136 is a pressure sensor operable to detect when the articulated appendage 106 touches down (e.g., when the foot 206 makes contact with the surface). In an example, the sensor 136 is also operable to detect how much pressure is being excreted on the articulated appendage 106 by the takeoff and landing surface.

Referring to FIG. 1, in some examples, the apparatus 104 includes an encoder 224. The encoder 224 is communicatively coupled with the controller 134. The encoder 224 is also communicatively coupled with the pivot actuator 212 to determine the relative pivotal position and/or orientation of the intermediate airfoil segment 116 relative to the inboard airfoil segment 114 and/or the outboard airfoil segment 120 relative to the intermediate airfoil segment 116. The encoder 224 is also communicatively coupled with the rotation actuator 214 to determine the relative rotational position and/or orientation of the intermediate airfoil segment 116 relative to the inboard airfoil segment 114 and/or the outboard airfoil segment 120 relative to the intermediate airfoil segment 116. The encoder 224 is operable to provide position data to the controller 134 correlating the pivotal and/or rotational position of each of the airfoil segments 108 of the articulated appendage 106. Based on the position data provided by the encoder 224, the controller 134 is configured to determine when to move and how much to move the articulated appendage 106 or each one of the airfoil segments 108 to position the articulated appendage 106 in a corresponding one of the flight configuration 112 or the ground configuration 110.

In some examples, the controller 134 is operable to execute one or more motion control algorithm 226. In an example, the motion control algorithm 226 is implemented by a software program or control logic of the controller 134. The motion control algorithm 226 may control the movement and position of the articulated appendage 106 in the flight configuration 112 during flight of the vehicle 100 and the ground configuration 110 during takeoff and landing of the vehicle 100.

In some examples, the motion control algorithm 226 directs the controller 134 to continuously monitor pitch and roll of the vehicle 100 as the vehicle 100 is landed. In this example, the logic instructs the articulated appendage 106 to move as needed to keep the pitch and roll angles of the vehicle 100 at approximately zero. In some examples, the motion control algorithm 226 instructs the controller 134 to command the first pivot joint 184 and/or the second pivot joint 186 of the articulated appendage 106 to bend freely as the articulated appendage 106 touches down. Once the pressure reading, for example, from the sensor 136, reaches a predetermined percentage of the weight of the vehicle 100, the controller 134 instructs the pivot lock 216 to lock the position of the articulated appendage 106.

In some examples, the motion control algorithm 226 instructs the controller 134 to monitor the pitch and roll readings while also including information and data from the sensor 136 and the encoder 224 in a feedback loop to selectively adjust the joints. In some examples, the controller 134 accesses pre-set programmed movements.

Figure 36:
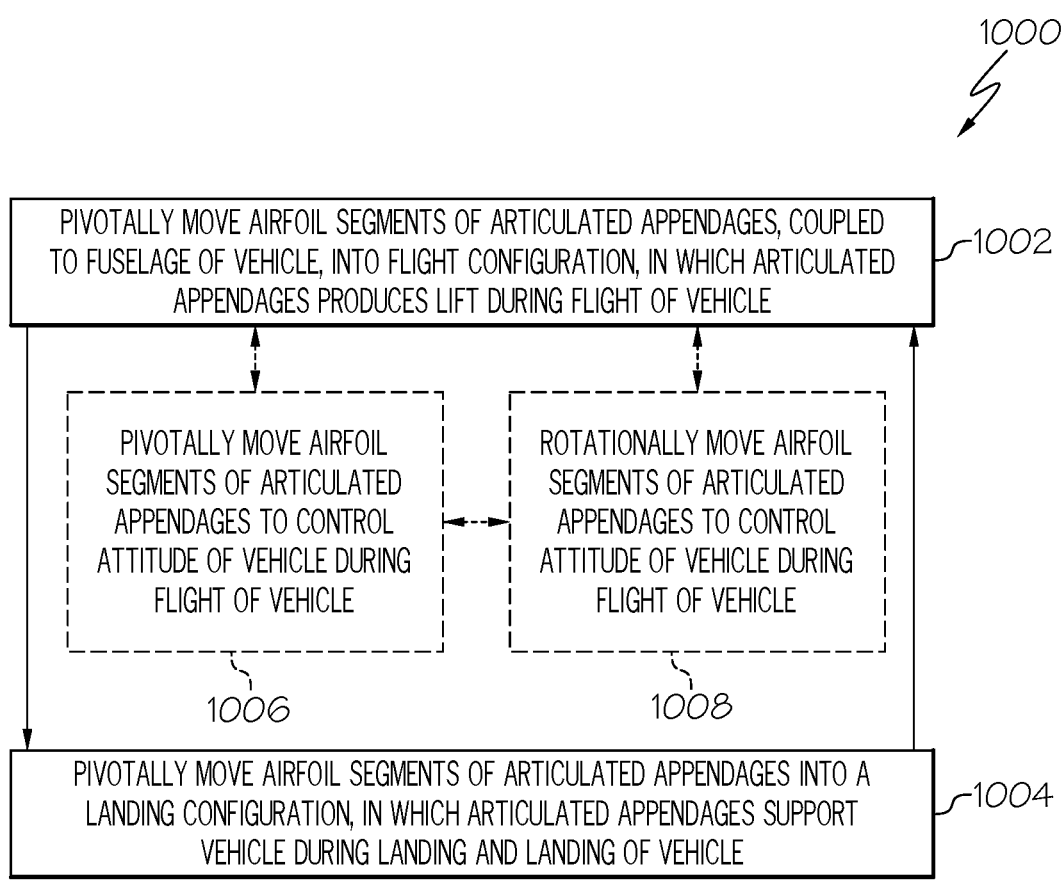
FIG. 36 is a flow diagram of an example of a method for operating a vehicle.

Referring to FIG. 36, also disclosed is a method 1000 for operating a vehicle 100. Examples of the method 1000 utilize the disclosed apparatus 104 to operate the vehicle 100 during flight and during takeoff and landing.

In an example, the method 1000 includes a step of pivotally moving at least one of the plurality of airfoil segments 108 of each one of the pair of articulated appendages 106, coupled to the fuselage 102 of the vehicle 100, into the flight configuration 112, in which each one of the pair of articulated appendages 106 produces lift during flight of the vehicle 100 (Block 1002).

In an example, the method 1000 includes a step of pivotally moving at least one of the plurality of airfoil segments 108 of each one of the pair of articulated appendages 106 into the ground configuration 110, in which each one of the pair of articulated appendages 106 supports the vehicle 100 during takeoff and landing of the vehicle 100 (Block 1004).

In an example, the method 1000 includes a step of, with articulated appendages 106 in the flight configuration 112, pivotally moving at least one of the plurality of airfoil segments 108 of each one of the pair of articulated appendages 106 to control an attitude of the vehicle 100 during flight of the vehicle 100 (Block 1006).

In an example, the method 1000 includes a step of, with articulated appendages 106 in the flight configuration 112, rotationally moving at least one of the plurality of airfoil segments 108 of each one of the pair of articulated appendages 106 to control the attitude of the vehicle 100 during flight of the vehicle 100 (Block 1006).

Figure 37:
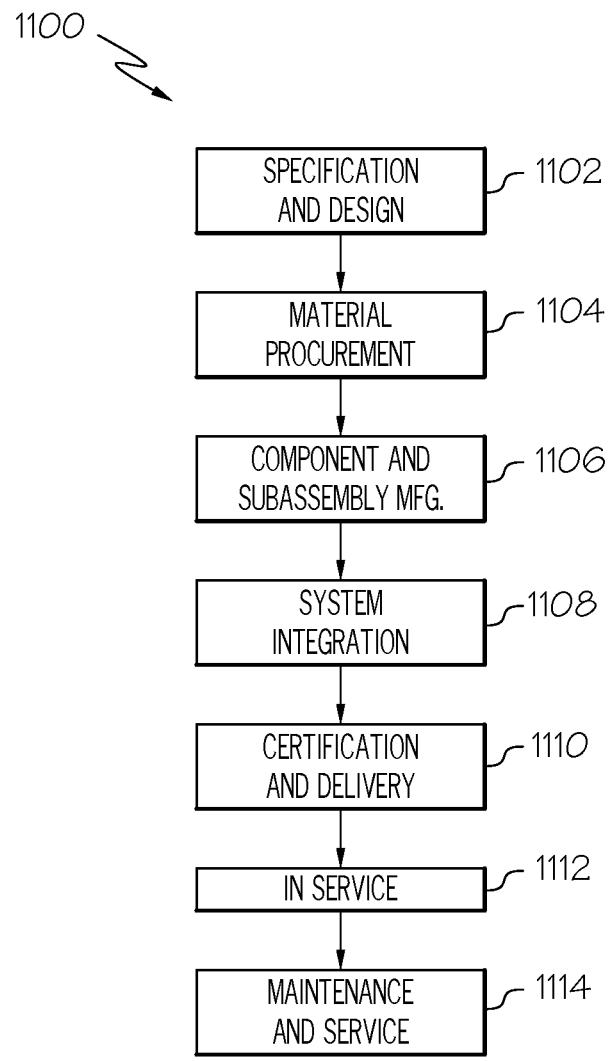
FIG. 37 is a flow diagram of an example aircraft production and service methodology.
Figure 38:
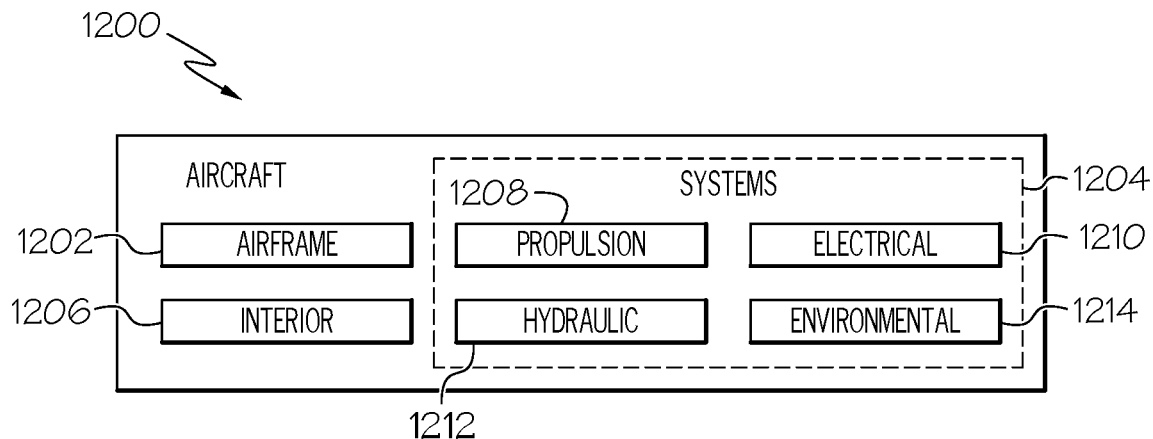
FIG. 38 is a schematic block diagram of an example of an aircraft.

Examples of the vehicle 100, the apparatus 104, and method 1000 disclosed herein may find use in a variety of potential applications, particularly in the transportation industry, including for example, aerospace applications. Referring now to FIGS. 37 and 38, examples of the vehicle 100, the apparatus 104, and method 1000 may be used in the context of an aircraft manufacturing and service method 1100, as shown in the flow diagram of FIG. 37, and the aircraft 1200, as shown in FIG. 38. Aircraft applications of the disclosed examples may include utilization of the apparatus 104, such as the plurality of the articulated appendages 106, on the aircraft 1200 to provide the combined functionality and operation of lift-generating wings during flight of the aircraft 1200 and ground-supporting landing gear during takeoff and landing of the aircraft 1200. In some examples, pivoting motions and rotational motions of the plurality of airfoil segments 108 may provide flight control surfaces to the vehicle 100.

As shown in FIG. 37, during pre-production, the illustrative method 1100 may include specification and design of aircraft 1200 (Block 1102) and material procurement (Block 1104). During production of the aircraft 1200, component and subassembly manufacturing (Block 1106) and system integration (Block 1108) of the aircraft 1200 may take place. Thereafter, the aircraft 1200 may go through certification and delivery (Block 1110) to be placed in service (Block 1112). The disclosed apparatus 104 and methods 1000 and 2000 may form a portion of component and subassembly manufacturing (Block 1106) and/or system integration (Block 1108). Routine maintenance and service (Block 1114) may include modification, reconfiguration, refurbishment, etc. of one or more systems of the aircraft 1200.

Each of the processes of the method 1100 illustrated in FIG. 37 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 38, the aircraft 1200, for example, produced by the method 1100, may include the airframe 1202, a plurality of high-level systems 1204, and an interior 1206. Other examples of the high-level systems 1204 include one or more of a propulsion system 1208, such as the propulsion system 144 (FIG. 1), an electrical system 1210, a hydraulic system 1212 and an environmental system 1214. Any number of other systems may be included.

Examples of the apparatus 104 and method 1000 shown or described herein may be employed during any one or more of the stages of the manufacturing and service method 1100 shown in the flow diagram illustrated by FIG. 37. For example, components or subassemblies, such as those that include the apparatus 104, corresponding to component and subassembly manufacturing (Block 1106) may be fabricated or manufactured in a manner similar to components or subassemblies produced while the aircraft 1200 is in service (Block 1112). Also, one or more examples of the apparatus 104, the method 1000, or combinations thereof may be utilized during production stages (Blocks 1108 and 1110). Similarly, one or more examples of the apparatus 104, the method 1000, or a combination thereof, may be utilized, for example and without limitation, while the aircraft 1200 is in service (Block 1112) and during the maintenance and service stage (Block 1114).

Although an aerospace example is shown, the principles disclosed herein may be applied to other industries. Accordingly, in addition to aircraft, the principles disclosed herein may apply to other vehicles, (e.g., space vehicles, autonomous air vehicles, underwater vehicles, etc.).

Reference herein to "example" means that one or more feature, structure, element, component, characteristic and/or operational step described in connection with the example is included in at least one embodiment and or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As used herein, the term "approximately" represent an amount close to the stated amount or value that still performs the desired function or achieves the desired result. For example, the term "approximately" may refer to an amount or value that is within less than 10% of, within less than 5% of, within less than 1% of, within less than 0.1% of, and within less than 0.01% of the stated amount or value.

In FIGS. 1 and 38, referred to above, the blocks may represent elements, components, and/or portions thereof and lines, if any, connecting various elements and/or components may represent mechanical, electrical, fluid, optical, electromagnetic and other couplings and/or combinations thereof. Couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples. Likewise, elements and/or components, if any, represented with dashed lines, indicate alternative examples. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 38 may be combined in various ways without the need to include other features described in FIGS. 1 and 38, other drawing figures, and/or the accompanying disclosure, even though such combination or combinations are not explicitly illustrated herein. Similarly, additional features not limited to the examples presented, may be combined with some or all of the features shown and described herein.

In FIGS. 36 and 37, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 36 and 37 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed vehicle, apparatus, and method have been shown and described, modifications may occur to those skilled in the art upon reading the specification. The present application includes such modifications and is limited only by the scope of the claims.

What is claimed is:

1. A vehicle comprising:
   a fuselage comprising a longitudinal axis;
   a propulsion system coupled to the fuselage;
   a pair of articulated appendages, each one of the pair of articulated appendages comprising:

an inboard end coupled to the fuselage;
an outboard end opposite the inboard end; and
a plurality of airfoil segments extending from the inboard end to the outboard end; and
a sensor located at the outboard end of each one of the pair of articulated appendages,
wherein:
each one of the pair of articulated appendages is moveable between a ground configuration, in which the outboard end of each one of the pair of articulated appendages supports the vehicle on a landing surface during takeoff or landing of the vehicle, and a flight configuration, in which each one of the pair of articulated appendages produces lift during flight of the vehicle; and
the sensor is configured to detect at least one of a location of the landing surface relative to the outboard end of a respective one of the pair of articulated appendages, motion of the landing surface relative to the outboard end of the respective one of the pair of articulated appendages, and a slope of the landing surface when the pair of articulated appendages is in the ground configuration.

2. The vehicle of claim 1, wherein the plurality of airfoil segments of each one of the pair of articulated appendages comprises:
an inboard airfoil segment coupled to the fuselage;
an intermediate airfoil segment pivotally coupled with the inboard airfoil segment along a first pivot axis; and
an outboard airfoil segment pivotally coupled with the intermediate airfoil segment along a second pivot axis.

3. The vehicle of claim 2, wherein the inboard airfoil segment is fixed relative to the fuselage of the vehicle.

4. The vehicle of claim 3, wherein the intermediate airfoil segment is pivotally movable about the first pivot axis relative to the inboard airfoil segment in an upward direction and a downward direction.

5. The vehicle of claim 4, wherein the outboard airfoil segment is pivotally movable about the second pivot axis relative to the intermediate airfoil segment in an upward direction and a downward direction.

6. The vehicle of claim 5, wherein:
the intermediate airfoil segment comprises an intermediate spanwise axis; and
the intermediate airfoil segment is rotationally movable about the intermediate spanwise axis relative to the inboard airfoil segment.

7. The vehicle of claim 6, wherein:
the outboard airfoil segment comprises an outboard spanwise axis; and
the outboard airfoil segment is rotationally movable about the outboard spanwise axis relative to the intermediate airfoil segment.

8. The vehicle of claim 2, wherein the first pivot axis is parallel to the longitudinal axis of the fuselage.

9. The vehicle of claim 2, wherein the first pivot axis is oblique to the longitudinal axis of the fuselage.

10. The vehicle of claim 2, wherein the second pivot axis is parallel to the longitudinal axis of the fuselage.

11. The vehicle of claim 2, wherein the second pivot axis is oblique to the longitudinal axis of the fuselage.

12. The vehicle of claim 2, wherein the first pivot axis and the second pivot axis are parallel to each another.

13. The vehicle of claim 2, wherein the first pivot axis and the second pivot axis are oblique to each another.

14. The vehicle of claim 1, further comprising a controller configured to independently actuate movement of each one of the pair of articulated appendages and process a signal from the sensor.

15. The vehicle of claim 1, wherein the sensor comprises at least one of an optical sensor and a pressure sensor.

16. The vehicle of claim 1, wherein each one of the pair of articulated appendages further comprises:
a spanwise dimension and a chordwise dimension;
a plurality of spanwise structural components extending along the spanwise dimension;
a plurality of chordwise structural components coupled to the spanwise structural components and extending along the chordwise dimension; and
a plurality of skin panels coupled to the chordwise structural components.

17. The vehicle of claim 1, further comprising a pair of second articulated appendages coupled to the fuselage, wherein each one of the pair of second articulated appendages comprises a plurality of second airfoil segments and is moveable between the ground configuration, in which each one of the pair of second articulated appendages supports the vehicle during takeoff or landing of the vehicle, and the flight configuration, in which each one of the pair of second articulated appendages produces lift during flight of the vehicle.

18. A combination flight and ground apparatus for a vehicle, the apparatus comprising:
an articulated appendage comprising:
an inboard end configured to be coupled to the vehicle;
an outboard end opposite the inboard end;
a plurality of airfoil segments extending from the inboard end to the outboard end; and
at least one actuator coupled to the plurality of airfoil segments and configured to move the plurality of airfoil segments between a ground configuration, in which the outboard end of the articulated appendage supports the vehicle on a landing surface during takeoff or landing of the vehicle, and a flight configuration, in which the articulated appendage produces lift during flight of the vehicle;
at least one sensor located at the outboard end of the articulated appendage and configured to detect at least one of a location of the landing surface relative to the outboard end of the articulated appendage, motion of the landing surface relative to the outboard end of the articulated appendage, and a slope of the landing surface when the articulated appendage is in the ground configuration; and
a controller coupled to the at least one actuator and to the at least one sensor, wherein the controller is configured to control movement of the plurality of airfoil segments and to process a signal from the at least one sensor.

19. A method for operating a vehicle, the method comprising:
pivotally moving at least one of a plurality of airfoil segments of each one of a pair of articulated appendages, coupled to a fuselage of the vehicle, into a flight configuration, in which each one of the pair of articulated appendages produces lift during flight of the vehicle;
pivotally moving at least one of the plurality of airfoil segments of each one of the pair of articulated appendages into a ground configuration, in which an outboard end of each one of the pair of articulated appendages supports the vehicle on a landing surface during takeoff or landing of the vehicle; and detecting at least one of a location of the landing surface relative to the outboard end of a respective one of the pair of articulated appendages, motion of the landing surface relative to the outboard end of the respective one of the pair of articulated appendages, and a slope of the landing surface when the pair of articulated appendages is in the ground configuration.

20. The method of claim 19, further comprising at least one of pivotally moving and rotationally moving at least one of the plurality of airfoil segments of each one of the pair of articulated appendages to control an attitude of the vehicle during flight of the vehicle.

\* \* \* \* \*